United States Patent
Chen et al.

(10) Patent No.: US 12,485,553 B2
(45) Date of Patent: Dec. 2, 2025

(54) SURGICAL ROBOT CONTROL METHOD, COMPUTER DEVICE, AND SURGICAL ROBOT SYSTEM

(71) Applicant: WUHAN UNITED IMAGING HEALTHCARE SURGICAL TECHNOLOGY CO., LTD., Wuhan (CN)

(72) Inventors: Long Chen, Wuhan (CN); Qin Huang, Wuhan (CN); Quan-Quan Wang, Wuhan (CN); Qiang Xie, Wuhan (CN); Yong-Xiang Nie, Wuhan (CN); Hao Gao, Wuhan (CN)

(73) Assignee: Wuhan United Imaging Surgical Co., Ltd., Wuhan (CN)

( * ) Notice: Subject to any disclaimer, the term of this patent is extended or adjusted under 35 U.S.C. 154(b) by 278 days.

(21) Appl. No.: 18/028,444

(22) PCT Filed: Sep. 24, 2021

(86) PCT No.: PCT/CN2021/120212
§ 371 (c)(1),
(2) Date: Mar. 24, 2023

(87) PCT Pub. No.: WO2022/063214
PCT Pub. Date: Mar. 31, 2022

(65) Prior Publication Data
US 2024/0025053 A1     Jan. 25, 2024

(30) Foreign Application Priority Data

Sep. 25, 2020 (CN) .......................... 202011024626.8
Sep. 25, 2020 (CN) .......................... 202011026975.3
Apr. 30, 2021 (CN) .......................... 202110483833.8

(51) Int. Cl.
*B25J 9/16* (2006.01)
*A61B 17/00* (2006.01)
(Continued)

(52) U.S. Cl.
CPC ............... *B25J 13/06* (2013.01); *A61B 34/32* (2016.02); *A61B 90/03* (2016.02); *B25J 9/1664* (2013.01)

(58) Field of Classification Search
CPC ......... B25J 13/06; B25J 9/1664; A61B 34/32; A61B 90/03; A61B 2090/064;
(Continued)

(56) References Cited

U.S. PATENT DOCUMENTS

2004/0267404 A1   12/2004   Danko
2009/0088774 A1   4/2009   Swarup et al.
(Continued)

FOREIGN PATENT DOCUMENTS

CN   101327589 A   12/2008
CN   101677827 A   3/2010
(Continued)

OTHER PUBLICATIONS

International Search Report of PCT/CN2021/120212.
(Continued)

*Primary Examiner* — Adam R Mott
*Assistant Examiner* — Heather J Keniry

(57) ABSTRACT

This application provides a surgical robot control method, a computer device, and a surgical robot system. The surgical robot control method includes: receiving a user demand, and generating an interactive control command; generating a motion control command according to the interactive control command; and controlling a terminal of a mechanical arm to perform the motion control command. The motion control command includes controlling the terminal of the mechani-
(Continued)

cal arm to act in accordance with a plurality of motion modes. The surgical robot control method may control the terminal of the mechanical arm to act in accordance with the plurality of motion modes through the motion control command, realize different motion schemes in various clinical application scenarios, and realize controlling the terminal of the mechanical arm to be flexibly switched between the plurality of motion modes in any application scenario through the interactive control command.

5 Claims, 18 Drawing Sheets

(51) Int. Cl.
*A61B 34/00* (2016.01)
*A61B 34/10* (2016.01)
*A61B 34/32* (2016.01)
*A61B 34/37* (2016.01)
*A61B 90/00* (2016.01)
*B25J 13/06* (2006.01)

(58) Field of Classification Search
CPC ......... A61B 34/25; A61B 34/37; A61B 34/77; A61B 2017/00119; A61B 2034/107; A61B 34/10
See application file for complete search history.

(56) References Cited

U.S. PATENT DOCUMENTS

| | | |
|---|---|---|
| 2009/0248037 A1 | 10/2009 | Prisco |
| 2010/0256526 A1 | 10/2010 | Hartting et al. |
| 2012/0029529 A1 | 2/2012 | Jun et al. |
| 2012/0109150 A1 | 5/2012 | Quaid et al. |
| 2014/0163736 A1 | 6/2014 | Azizian et al. |
| 2015/0100066 A1 | 4/2015 | Kostrzewski et al. |
| 2016/0007826 A1 | 1/2016 | Frimer et al. |
| 2016/0158494 A1 | 6/2016 | Wenderow et al. |
| 2016/0361122 A1 | 12/2016 | Seeber |
| 2016/0361128 A1 | 12/2016 | Seeber |
| 2017/0000572 A1 | 1/2017 | Moctezuma de la Barrera et al. |
| 2017/0215974 A1* | 8/2017 | Nowlin .................. A61B 34/71 |
| 2017/0252113 A1 | 9/2017 | Beelen et al. |
| 2017/0273715 A1 | 9/2017 | Piron et al. |
| 2018/0043525 A1 | 2/2018 | Su et al. |
| 2018/0193099 A1* | 7/2018 | Kim ....................... A61B 34/30 |
| 2019/0015164 A1 | 1/2019 | Quaid et al. |
| 2019/0133791 A1 | 5/2019 | Yadav et al. |
| 2020/0197108 A1 | 6/2020 | Usui |
| 2020/0289205 A1 | 9/2020 | Scheib et al. |
| 2021/0330325 A1* | 10/2021 | Wilson ................... A61B 34/30 |
| 2022/0110684 A1* | 4/2022 | Mensink ................ A61B 34/20 |
| 2022/0361972 A1* | 11/2022 | Armand ................. A61B 34/37 |

FOREIGN PATENT DOCUMENTS

| | | |
|---|---|---|
| CN | 103699056 A | 4/2014 |
| CN | 104470456 A | 3/2015 |
| CN | 105411679 A | 3/2016 |
| CN | 106236258 A | 12/2016 |
| CN | 106344332 A | 1/2017 |
| CN | 107206588 A | 9/2017 |
| CN | 206934172 U | 1/2018 |
| CN | 107928791 A | 4/2018 |
| CN | 108044463 A | 5/2018 |
| CN | 108348298 A | 7/2018 |
| CN | 108942938 A | 12/2018 |
| CN | 109259865 A | 1/2019 |
| CN | 109531565 A | 3/2019 |
| CN | 109571478 A | 4/2019 |
| CN | 109605369 A | 4/2019 |
| CN | 109640867 A | 4/2019 |
| CN | 109702742 A | 5/2019 |
| CN | 109834706 A | 6/2019 |
| CN | 109875660 A | 6/2019 |
| CN | 109877836 A | 6/2019 |
| CN | 109893221 A | 6/2019 |
| CN | 110114031 A | 8/2019 |
| CN | 110228069 A | 9/2019 |
| CN | 110394801 A | 11/2019 |
| CN | 110549334 A | 12/2019 |
| CN | 110559083 A | 12/2019 |
| CN | 110636923 A | 12/2019 |
| CN | 110653821 A | 1/2020 |
| CN | 110680475 A | 1/2020 |
| CN | 110757458 A | 2/2020 |
| CN | 110840534 A | 2/2020 |
| CN | 110850807 A | 2/2020 |
| CN | 110893118 A | 3/2020 |
| CN | 111216125 A | 6/2020 |
| CN | 111297479 A | 6/2020 |
| CN | 111513849 A | 8/2020 |
| CN | 111590564 A | 8/2020 |
| CN | 111618857 A | 9/2020 |
| CN | 111658166 A | 9/2020 |
| CN | 111870349 A | 11/2020 |
| CN | 112168352 A | 1/2021 |
| CN | 112192566 A | 1/2021 |
| CN | 113276111 A | 8/2021 |
| JP | 2019030931 A | 2/2019 |
| RU | 198063 U1 | 6/2020 |
| TW | 202021752 A | 6/2020 |
| WO | 2018086226 A1 | 5/2018 |

OTHER PUBLICATIONS

"Study on Robot-Assisted System for Percutaneous Surgery Based on 3D Ultrasound Images", Sun Yinshan, China National Knowledge Infrastructure, Apr. 15, 2012.
European Search Report (EP Application No. 21871583.7), dated Sep. 23, 2024, 10 pages.
Yang, Jiezhong, "Fundamentals of Industrial Robotics Technology", China Machine Press; Jan. 2018; pp. 65-67 (5 pages).
1st Office Action from CN2021108916529.
2nd Office Action from CN2021108916529.
1st Office Action from CN2021104838338.
2nd Office Action from CN2021104838338.
Chinese Decision to Grant (Application No. 202510147057.2), dated Aug. 26, 2025, 4 pages.

* cited by examiner

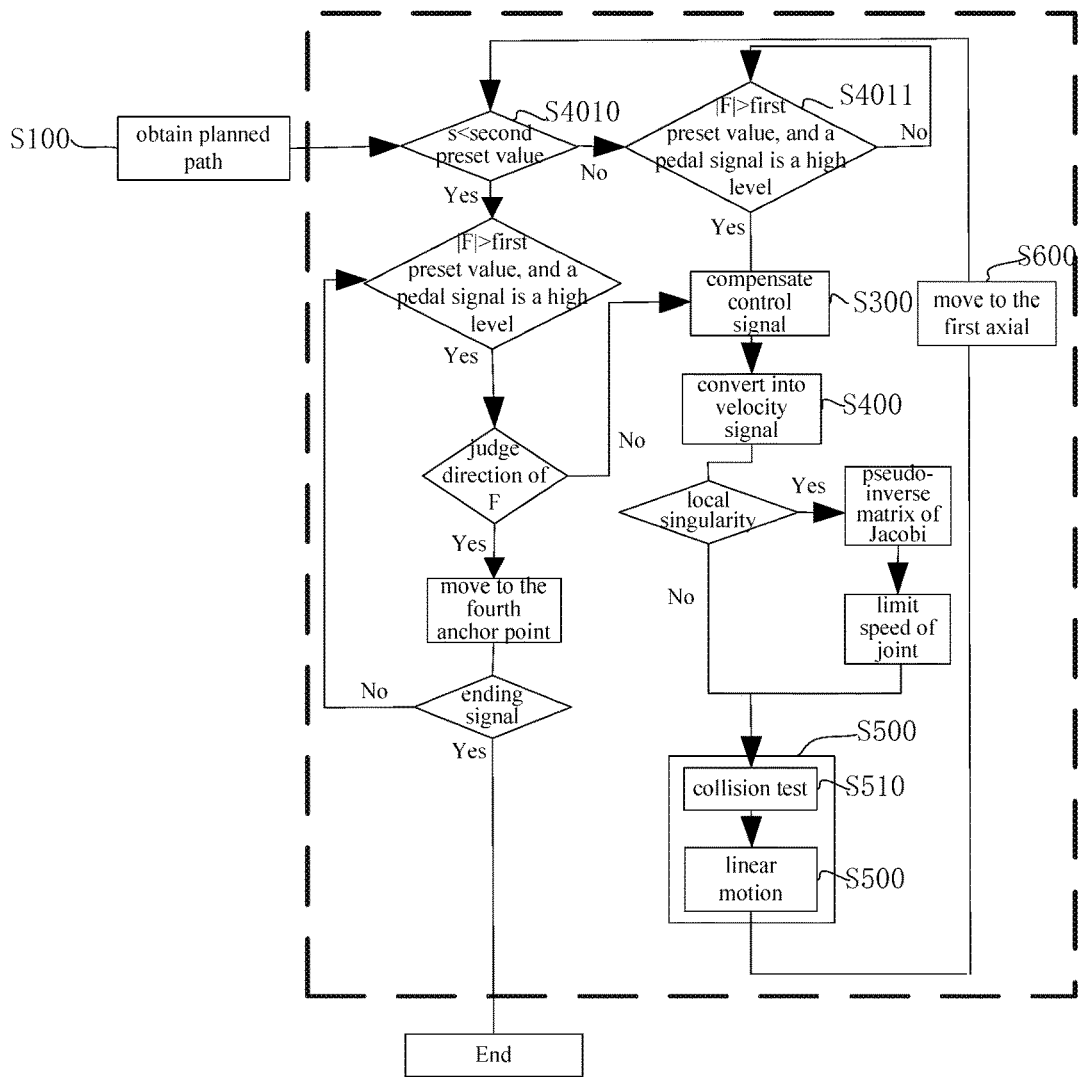

A first path 111 is acquired. The first path 111 passes through a second target point 132 and a second craniotomy point 122, and the terminal adapter 80 is located at a third anchor point 330. The first path 111 passes through the third anchor point 330, the second craniotomy point 122, and the second target point 132 in sequence.

S2000

A position command is obtained, and according to the position command, the terminal adapter 80 is controlled to move along a first plane or a first spherical surface in which the third anchor point 330 is located. The first plane is perpendicular to the first path 111.

FIG. 15

SURGICAL ROBOT CONTROL METHOD, COMPUTER DEVICE, AND SURGICAL ROBOT SYSTEM

RELATED APPLICATION

This application is a U.S. National Stage of International Application No PCT/CN2021/120212, filed on Sep. 24, 2021, which claims the priorities of Chinese Patent Application No. 2020110246268, filed on Sep. 25, 2020, entitled "Control Method for Terminal Adapter of Mechanical Arm", and Chinese Patent Application No. 2021104838338, filed on Apr. 30, 2021, entitled "Control Method and Control System for Surgical Robot", and Chinese Patent Application No. 2020110269753, filed on Sep. 25, 2020, and entitled "Surgical Robot Control Method, Computer Device, and Surgical Robot System", which are hereby incorporated by reference in their entireties.

TECHNICAL FIELD

This application relates to the field of medical technology, and more particularly, to a surgical robot control method, a computer device, and a surgical robot system.

BACKGROUND

A surgical robot-assisted surgery can improve the efficiency and the quality of the surgery. The surgical robot includes hardware devices such as a control system, a mechanical arm, a ground brake, a foot pedal, and an imaging device. The mechanical arm, the ground brake, the foot pedal, and the imaging device are connected to the control system, respectively. The control system and the mechanical arm include a plurality of control logic arithmetic systems therein. The arithmetic logic of the control logic arithmetic system of the conventional surgical robot is not clear, the operation of the mechanical arm controlled by the control system is not flexible enough, and the safety performance is poor.

SUMMARY

In order to solve a problem of safety hazard caused by a massive increase in heat generation of a human body due to an addition of a metasurface in the prior art, a magnetic field enhancement assembly and a magnetic field enhancement device are provided.

This application provides a surgical robot control method including:
  receiving a user demand, and generating an interactive control command;
  generating a motion control command according to the interactive control command; and
  controlling a terminal of a mechanical arm to perform the motion control command, and the motion control command comprising controlling the terminal of the mechanical arm to act in accordance with a plurality of motion modes.

A surgical robot control system includes:
a master control module, configured to generate a motion control command;
an interaction module, being in an information interaction with the master control module, and configured to receive a user demand, generate an interactive control command, and send the interactive control command to the master control module; and
a plurality of motion modules, being in information interactions with the master control module, and configured to perform the motion control command.

A surgical robot control method includes:
acquiring position and orientation information at a first anchor point and position and orientation information at a second anchor point of a terminal adapter fixed at a terminal of a mechanical arm, and obtaining a planned path of the mechanical arm corresponding to the terminal adapter moving from the first anchor point to the second anchor point along a first axis, based on the position and orientation information at the first anchor point and the position and orientation information at the second anchor point; the first axis passing through the first anchor point, the second anchor point, a first craniotomy point, and a first target point sequentially, and the terminal adapter being configured to clamp a surgical instrument;
determining whether a singularity occurs in the planned path of the mechanical arm;
acquiring a control signal if no singularity occurs in the planned path of the mechanical arm;
converting the control signal to a velocity signal; and
controlling the mechanical arm to move according to the velocity signal to drive the terminal adapter to move between the first anchor point and the second anchor point in a straight line along the first axis.

A computer device includes a memory and a processor. A computer program is stored on the memory, and the processor, when executing the computer program, performs steps of the method of any embodiments above.

A surgical robot system includes a mechanical arm; a signal sensing device, fixed to a terminal of the mechanical arm; a terminal adapter, fixedly mounted to the signal sensing device, and configured to have a surgical instrument mounted thereon and receive a control signal; and a control device, including a memory and a processor. A computer program is stored on the memory, and the processor, when executing the computer program, performs steps of the method of any embodiment above.

A control method for a terminal adapter of a mechanical arm, includes:
  acquiring a first path, the first path passing through a second target point and a second craniotomy point, and the terminal adapter being located at a third anchor point, and the first path passing through the third anchor point, the second craniotomy point, and the second target point in sequence; and
  obtaining a position command, and controlling the terminal adapter to move along a first plane or a first spherical surface in which the third anchor point is located according to the position command. The first plane is perpendicular to the first path.

A surgical robot system includes a mechanical arm, comprising a terminal adapter; and a control device, comprising a memory and a processor, wherein a computer program is stored in the memory, and the processor, when executing the computer program, performs steps of the method of any embodiment above.

A computer-readable storage medium has a computer program stored thereon. The computer program, when executed by a processor, causes the processor to perform steps of the method of any embodiment.

This application relates to the surgical robot control method, the computer device, and the surgical robot system. The surgical robot control method includes: receiving the user demand, and generating the interactive control command; generating the motion control command according to the interactive control command; and controlling the terminal of the mechanical arm to perform the motion control command. The motion control command includes controlling the terminal of the mechanical arm to act in accordance with the plurality of motion modes. The surgical robot control method may control the terminal of the mechanical arm to act in accordance with the plurality of motion modes through the motion control command, realize different motion schemes in various clinical application scenarios, and realize controlling the terminal of the mechanical arm to be flexibly switched between the plurality of motion modes in any application scenario through the interactive control command.

BRIEF DESCRIPTION OF THE DRAWINGS

In order to illustrate the technical solutions in the embodiments of this application or the prior art more clearly, the accompanying drawings required for the description of the embodiments of this application or the prior art will be described briefly. Obviously, the accompanying drawings described hereinafter are merely embodiments of this application, and other drawings may be obtained by those of ordinary skill in the art without involving any creative efforts according to the disclosed drawings.

FIG. 14 is a schematic flow chart of a velocity control method according to an embodiment of this application;

FIG. 15 is a flow chart of a control method of a terminal adapter of a mechanical arm according to an embodiment of this application;

In the drawings:

Figure 1:
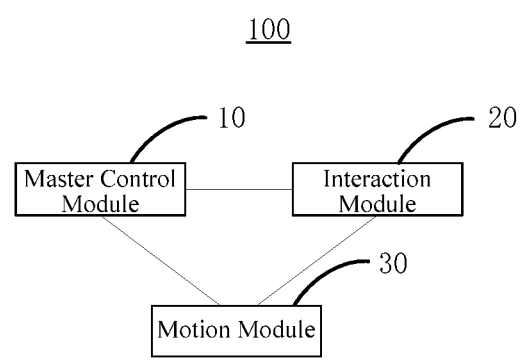
FIG. 1 is a schematic view showing a surgical robot control system according to an embodiment of this application.

surgical robot control system 100, master control module 10, interaction module 20, self-circulating interaction device 21, autonomous interaction device 22, pre-defined motion interaction device 23, one-way switching device 24, motion module 30, free motion module 31, autonomous motion module 32, axial motion module 33, fine-adjustment motion module 34, spheric motion module 35, safety prevention and control system 40, emergency stop device 41, safety boundary arithmetic device 42, obstacle collision evading device 43, trajectory interlocking device 44, surgical robot system 50, signal sensing device 70, first connecting member 300, terminal adapter 80, second connecting member 400, first craniotomy point 121, second craniotomy point 122, third craniotomy point 123, fourth craniotomy point 124, fifth craniotomy point 125, first target point 131, second target point 132, third target point 133, first axis 100, optical monitoring device 110, optical element 116, detector 117, mechanical arm 60, first path 111, first limit point 113, second path 112, second limit point 114, third path 115, maximum allowable distance Lmax, maximum allowable arc length Lmax, first anchor point 210, second anchor point 220, third anchor point 330, fourth anchor point 440, fifth anchor point 450, sixth anchor point 460

DETAILED DESCRIPTION OF THE EMBODIMENTS

In order to facilitate understanding of this application, this application will be described more fully hereinafter with reference to the accompanying drawings. Preferred embodiments of this application are shown in the accompanying drawings. However, this application may be implemented in many different forms and is not limited to the embodiments described herein. On the contrary, these embodiments are provided for a more thorough understanding of the present disclosure.

It should be noted that when an element is referred to as being "fixed" on another element, the element may be directly on the other element or there may be an intermediate element therebetween. When an element is referred to as being "connected" to another element, the element may be directly connected to the other element or there may be an intermediate element therebetween. As used herein, the terms "vertical", "horizontal", "left", "right", and the like, are used for purposes of illustration only, but are not intended to represent a unique embodiment.

Unless defined otherwise, all technical and scientific terms used herein have the same meaning as commonly understood by the ordinary skill in the art to which this application belongs. The terminologies in the specification of this application are used for the purpose of describing specific embodiments only, but are not intended to limit the application, the term "and/or" used herein includes any combination and all combinations of one or more of relevant listed items.

The terms "first" and "second" in this application do not represent specific numbers and a specific order, but are just used for distinguishing objects.

Referring to FIG. 1, FIG. 1 shows a surgical robot control system 100 provided in this application. The surgical robot control system 100 includes a master control module 10, an interaction module 20, and a plurality of motion modules 30.

The master control module 10 is configured to generate a motion control command. The master control module 10 may include a computer host and a computer program stored in the computer host.

The interaction module 20 is in an information interaction with the master control module 10. The interaction module 20 is configured to receive a motion control command from the master control module 10 and generate an interactive control command according to a user's requirement. The user's requirement herein may be to control a mechanical arm to move a certain distance in a certain direction, or to control the terminal of the mechanical arm to enter a certain precision area.

The plurality of motion modules 30 are in information interactions with the master control module 10. The plurality of motion modules 30 are configured to perform the motion control command. Moreover, the plurality of motion modules 30 are in information interactions with the interaction module 20, that is, the plurality of motion modules 30 are logically interconnected with the interaction module 20. Similarly, the user clicks on a certain motion module of the plurality of motion modules 30 through the interaction module 20. The command is passed to the master control module 10, and a control software in the master control module 10 generates a motion control command required by the certain motion module, then the motion control command is sent to the plurality of motion modules 30, and the corresponding motion mode is performed by the mechanical arm and the mechanical arm control system. The plurality of motion modules 30 may be switched to each other. The switching between the plurality of motion modules 30 may direct a more secure and flexible motion of the mechanical arm or the terminal of the mechanical arm.

The surgical robot control system 100 provided in this embodiment may manage or switch the motion modes of the plurality of motion modules 30 through the interaction module 20, thereby realizing flexible switching between the motion modes in any application scenario and achieving a secure and reliable real-time motion function of the mechanical arm. In addition, the surgical robot control system 100 in the present embodiment may be applied to flexible, reliable, and safe multi-mode motion modules and motion schemes of a mechanical arm, and it is not only applicable to a stereotactic surgical robot, but also applied to a surgical robot, which is based on six-degree-of-freedom mechanical arm or seven-degree-of-freedom mechanical arm and used in an orthopedic or spinal-type treatment such as a joint replacement, a bone injury treatment, and the like.

Figure 2:
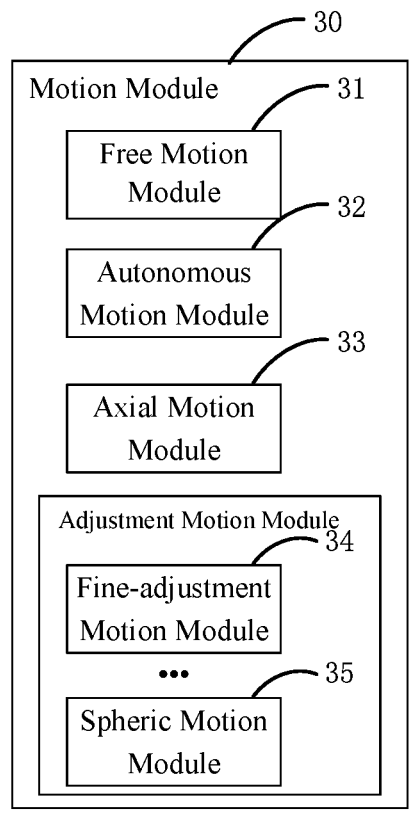
FIG. 2 is a schematic view showing a motion module according to an embodiment of this application.

Referring to FIG. 2, FIG. 2 is a schematic view showing a motion module 30 according to an embodiment of this application. In an embodiment, the plurality of motion modules 30 include a free motion module 31, an autonomous motion module 32, an axial motion module 33, and an adjustment motion module.

The free motion module 31 is in information interactions with each of the master control module 10 and the interaction module 20. The free motion module 31 is configured to control a free movement of the terminal of the mechanical arm. In the free motion module 31, the user manually drags the terminal of the mechanical arm to move freely, that is, the user may control the mechanical arm to move freely in motion space of the mechanical arm. Specifically, the free motion module 31 may control the mechanical arm, under any condition that the mechanical arm is movable, to move in any trajectory by manually dragging the terminal of the mechanical arm by the user. Generally, a gripping portion, which makes it convenient for a user to grip, is provided at the terminal of the mechanical arm. The gripping portion may make front, rear, left, right, up, and down translational motions nearby the gripping portion, may make counterclockwise and clockwise rotations, and the like, and may make a resultant motion of the rotational and translational motions. In a specific implementation, the user instructs to enter a working state of the free motion module 31 through the master control module 10. That is, the user clicks a button "free movement" on an operation interface of the master control module 10, then may enter the free motion module 31 to work.

During an implementation, the master control module 10 receives an input of entering the free motion module 31 from the user, and then sends a parameter of a free motion mode and a command of unlocking the mechanical arm to the free motion module 31. The free motion module 31 receives two parameters above, and determines whether a communication with the six-degree-of-freedom force sensor arranged at the terminal and data reading are normal or not, for the reason that the free motion mode is a force control mode, and a prerequisite is that the six-degree-of-freedom force sensor at the terminal operates normally. If yes, the parameter of the free motion mode, and points which are required for the mechanical arm joint motion and calculated according to real-time external force information acquired by the six-degree-of-freedom force sensor, are sent to an underlying control hardware (which may be a mechanical arm control cabinet). When it is detected that an enable signal of the foot pedal is effective, the underlying control hardware executes the free motion mode according to external drag force information.

The autonomous motion module 32 is in information interactions with each of the master control module 10 and the interaction module 20. The autonomous motion module 32 is configured to make an autonomous motion according to a path point planned by the master control module 10. Without a manual intervention of the user, the terminal of the mechanical arm automatically moves from a current position to a predefined surgical target point, thereby realizing positioning and orienting functions of the surgical instrument. The autonomous motion module 32 refers to the autonomous motion module which enables the robot or the mechanical arm to avoid obstacles autonomously.

In a specific embodiment, the master control module 10 itself determines whether a spatial registration process has been completed, and whether a spatial registration result has been confirmed, which are ensured by a workflow. The master control module 10 needs to send path information (a starting point and a final point) to be planned to a path planning algorithm of the autonomous motion module 32. The autonomous motion module 32 plans a path according to the path information. After the planning is successful, the trajectory points are sent to the underlying control hardware (the mechanical arm control cabinet). The underlying control hardware waits for the foot pedal to be stepped down, and the mechanical arm performs according to the planned path points till it moves to the final target point.

The axial motion module 33 is in information interactions with each of the master control module 10 and the interaction module 20. The axial motion module 33 is configured to control the terminal of the mechanical arm to move along a predefined axial direction. When manually dragged by the user, the terminal of the mechanical arm can only move in one direction of the surgical instrument depth puncturing direction, and cannot move or rotate in any other direction. During a surgery, after the mechanical arm completes an automatic motion and is positioned, a surgeon needs to manually adjust a distance between the surgical instrument and the target point without affecting the pose, thereby achieving the more accurate orienting function.

In a specific embodiment, the master control module 10 itself determines whether the spatial registration process has been completed, and whether the spatial registration result has been confirmed, which are ensured by the workflow.

The master control module 10 itself determines whether a process for performing one path has been completed and whether the path has been moved through. Since the axial motion module 33 and the autonomous motion module 32 are coupled together, i.e., the axial motion mode is enabled only after the autonomous movement has been completed in a certain path and the path has been moved through, otherwise the axial motion mode is always in a disabled state, i.e., the user cannot actively trigger the axial motion mode.

After receiving the parameter of the axial mode (the axial mode is also a force control mode based on the six-degree-of-freedom force sensor), the axial motion module 33 checks the operation of the six-degree-of-freedom force sensor. If the operation is normal, the motion points of the axial motion of the mechanical arm are calculated according to an axial motion algorithm and sent to the underlying control hardware. After receiving the parameter of the axial mode and receiving the motion points which the mechanical arm will move to, the underlying control hardware performs the axial motion under the control of the foot pedal.

The fine-adjustment motion module 34 is in information interactions with each of the master control module 10 and the interaction module 20. The fine-adjustment motion module 34 is configured to control the terminal of the mechanical arm to translate for a predetermined distance in a fixed direction in a predefined plane. An automatic motion can be accomplished according to predefined motion parameters without the user's manual dragging. In combination with clinical application scenarios, there may be a planar fine-adjustment and a spheric fine-adjustment. The planar fine-adjustment refers to a step motion of moving at equal intervals or at set intervals along the front, rear, left, and right directions in an end face of an instrument arranged at the terminal of the mechanical arm, and the motions may be further expanded to motions in eight directions including four diagonal directions. The spheric fine-adjustment refers to a motion of moving at equal arc along the front, rear, left, and right directions in a spherical surface having a constant radius and centered on a target point. The planar fine-adjustment mode and the spheric fine-adjustment mode refer to stepping for a small displacement on a specific plane or spherical surface. Whereas, the spheric mode means that a human assists the mechanical arm in moving within a particular area (e.g., within a cone) without going beyond the area while the center point of the instrument remains unchanged. Specifically, the fine-adjustment motion module 34 may provide parameters such as a fine-adjustment step size, a fine-adjustment distance, and a fine-adjustment direction.

In a specific embodiment, the master control module 10 itself determines whether the spatial registration process has been completed, and whether the spatial registration result has been confirmed, which are ensured by the workflow. The master control module 10 itself determines whether a process for performing one path has been completed and whether the path has been moved through. The fine-adjustment motion mode is coupled with the autonomous motion mode, that is the fine-adjustment motion mode is enabled only after the autonomous movement has been completed in a certain path and the path has been moved through, otherwise the fine-adjustment motion mode is always in a disabled state, i.e., the user cannot actively trigger the fine-adjustment motion mode.

The adjustment motion module is in information interactions with each of the master control module 10 and the interaction module 20. The adjustment motion module is configured for a final adjustment before the axial motion of the terminal of the mechanical arm. In an embodiment, the adjustment motion module includes a fine-adjustment motion module 34 and/or a spheric motion module 35. In other embodiments, the adjustment motion module may also include other types of irregular fine-adjustment motion modules.

After receiving parameters such as a mode parameter (the fine-adjustment mode), a fine-adjustment distance and a fine-adjustment direction, the fine-adjustment motion module 34 calculates the motion points of the fine-adjustment motion of the mechanical arm according to a fine-adjustment motion algorithm, and sends the motion points to the underlying control hardware. After receiving the mode parameter (the fine-adjustment mode) and the motion points which the mechanical arm will move to, the underlying control hardware performs the fine-adjustment motion under the control of the foot pedal.

The spheric motion module 35 is in information interactions with each of the master control module 10 and the interaction module 20. The spheric motion module 35 is configured to control the terminal of the mechanical arm to move along a predefined spherical surface. The spheric motion is similar to the above-mentioned spheric fine-adjustment motion mode, but differs from the spheric fine-adjustment motion mode in that the spheric motion is a restricted spherical motion that is manually dragged by the user according to different application scenarios.

In a specific embodiment, the master control module 10 itself determines whether the spatial registration process has been completed, and whether the spatial registration result has been confirmed, which are ensured by the workflow. The master control module 10 itself determines whether a process for performing one path has been completed and whether the path has been moved through. The spheric motion mode is coupled with the autonomous motion mode, that is the spheric motion mode is enabled only after the autonomous movement has been completed in a certain path and the path has been moved through, otherwise the spheric motion mode is always in a disabled state, i.e., the user cannot actively trigger the spheric motion mode.

After receiving parameters such as a parameter of the spheric mode, a spheric distance, and a spherical direction, the spheric motion module 35 calculates the motion points of the spheric motion of the mechanical arm according to a spheric motion algorithm, and sends the motion points to the underlying control hardware. After receiving the parameter of the spheric mode and the motion points which the mechanical arm will move to, the underlying control hardware performs the spheric motion under the control of the foot pedal.

The surgical robot control system 100 provided in the present application may enable the stereotactic surgical robot to satisfy motion schemes in various clinical application scenarios. Specifically, during the treatment of spinal diseases, the surgical robot based on the six-degree-of-freedom or seven-degree-of-freedom mechanical arm may realize that: the free motion module 31 is switched to the axial motion module 33, and after the terminal of the mechanical arm moves to a first anchor point, the axial motion module 33 may be switched to the fine-adjustment motion module 34, and the terminal of the mechanical arm moves slowly to a second anchor point, and then specific surgical procedures are performed according to the surgical protocol. The second anchor point is closer to an affected part than the first anchor point is.

Figure 3:
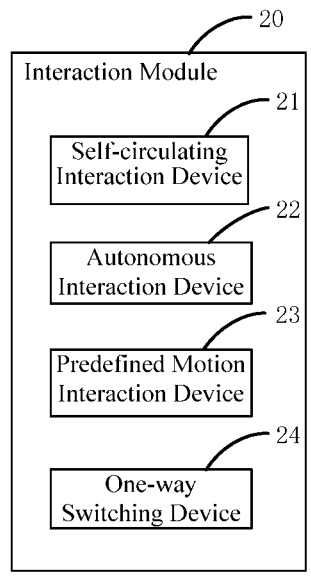
FIG. 3 is a schematic view showing an interaction module according to an embodiment of this application.
Figure 4:
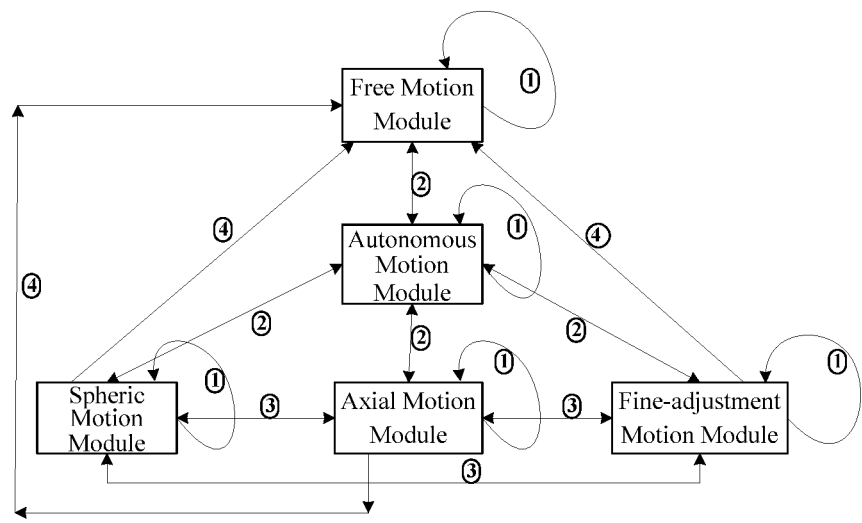
FIG. 4 is a schematic view showing switching between different motion modules according to an embodiment of this application.

Referring to FIGS. 3 and 4, FIG. 3 is a schematic view showing an interaction module 20 according to an embodiment of this application. FIG. 4 is a schematic view showing switching between different motion modules 30 according to an embodiment of this application. Different motion modules of the plurality of motion modules 30 may be flexibly switched according to actual clinical application scenarios, and a logic diagram of flexible switching between different motion modules is shown in FIG. 4.

In an embodiment, the interaction module 20 includes a self-circulating interaction device 21.

The self-circulating interaction device 21 is in information interactions with each of the plurality of motion modules 30. The self-circulating interaction device 21 is configured to control each motion module of the plurality of motion modules 30 to execute circularly for several times. In this embodiment, after being elected, each motion module may execute circularly for several times, as shown by ① in FIG. 4.

In an embodiment, the interaction module 20 further includes an autonomous interaction device 22.

The autonomous interaction device 22 is in information interactions with each of the plurality of motion modules 30. The autonomous interaction device 22 is configured to control interactions between the autonomous motion module 32 and each of the free motion module 31, the axial motion module 33, the fine-adjustment motion module 34, and the spheric motion module 35 to be performed, as shown by ② in FIG. 4.

In an embodiment, the interaction module 20 further includes a predefined motion interaction device 23.

The predefined motion interaction device 23 is in information interactions with each of the axial motion module 33, the fine-adjustment motion module 34, and the spheric motion module 35. The predefined motion interaction device 23 is configured to control a two-way interaction between the axial motion module 33 and the fine-adjustment motion module 34, a two-way interaction between the axial motion module 33 and the spheric motion module 35, and a two-way interaction between the fine-adjustment motion module 34 and the spheric motion module 35 to be performed, as shown by ③ in FIG. 4.

In an embodiment, the interaction module 20 further includes a one-way switching device 24.

The one-way switching device 24 is in information interactions with each of the free motion module 31, the axial motion module 33, the fine-adjustment motion module 34, and the spheric motion module 35. The one-way switching device 24 is configured to control a one-way switching of each of the axial motion module 33, the fine-adjustment motion module 34, and the spheric motion module 35 to the free motion module 31 to be performed, as shown by ④ in FIG. 4.

Since during an actual operation of the plurality of motion modules 30, only after the process for performing a certain path has been completed according to the autonomous motion module, is it allowed to switch to the axial motion module 33, the fine-adjustment motion module 34, and the spheric motion module 35. Therefore, in the clinical application scenario, the switching of each of the axial motion module 33, the fine-adjustment motion module 34, and the spheric motion module 35 to the free motion module 31 is the one-way switching.

Figure 5:
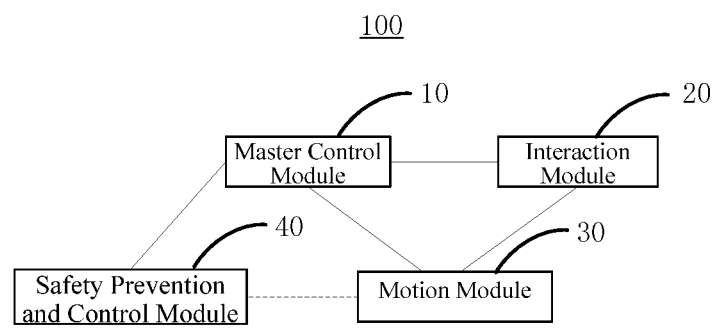
FIG. 5 is a schematic view showing a surgical robot control system according to an embodiment of this application.

Referring to FIG. 5, FIG. 5 is a schematic view showing a surgical robot control system 100 according to an embodiment of this application. In an embodiment, the surgical robot control system 100 further includes a safety prevention and control system 40. The safety prevention and control system 40 are in an information interaction with each of the master control module 10 and the plurality of motion modules 30. The safety prevention and control system 40 is configured to execute the safety prevention and control for the surgical robot control system 100.

The surgical robot control system 100 provided in this embodiment includes the master control module 10, the interaction module 20, the plurality of motion modules 30, and the safety prevention and control system 40. The surgical robot control system 100 of this embodiment includes the safety prevention and control system 40 for executing the safety prevention and control for the surgical robot control system 100. The surgical robot control system 100 may manage or switch the motion modes of the plurality of motion modules 30 through the interaction module 20, thereby realizing flexible switching between the motion modes in any application scenario and achieving a safe and reliable real-time motion function of the mechanical arm. In addition, the surgical robot control system 100 in the present embodiment may be applied to flexible, reliable, and safe multi-mode motion modules and motion schemes of the mechanical arm, and it is not only applicable to a stereotactic surgical robot, but also applicable to a surgical robot, which is based on six-degree-of-freedom mechanical arm or seven-degree-of-freedom mechanical arm and used in an orthopedic or spinal-type treatment such as a joint replacement, a bone injury treatment, and the like.

The surgical robot control system 100 provided in the embodiment of this application defines a plurality of motion modules 30 according to clinical scenarios. A corresponding security design has been considered for each motion module 30. When using the surgical robot control system 100, the user only considers an actual clinical application and needs not to pay too much attention to the security design, since the corresponding security design is completely accomplished by the surgical robot control system 100. Moreover, according to the actual clinical application scenario, all motion modes may be flexibly switched to each other, thereby expanding the usability and security design in the application scenario of the stereotactic surgical robot, and further reducing the dependence of the surgeon user on the system operation experience.

Figure 6:
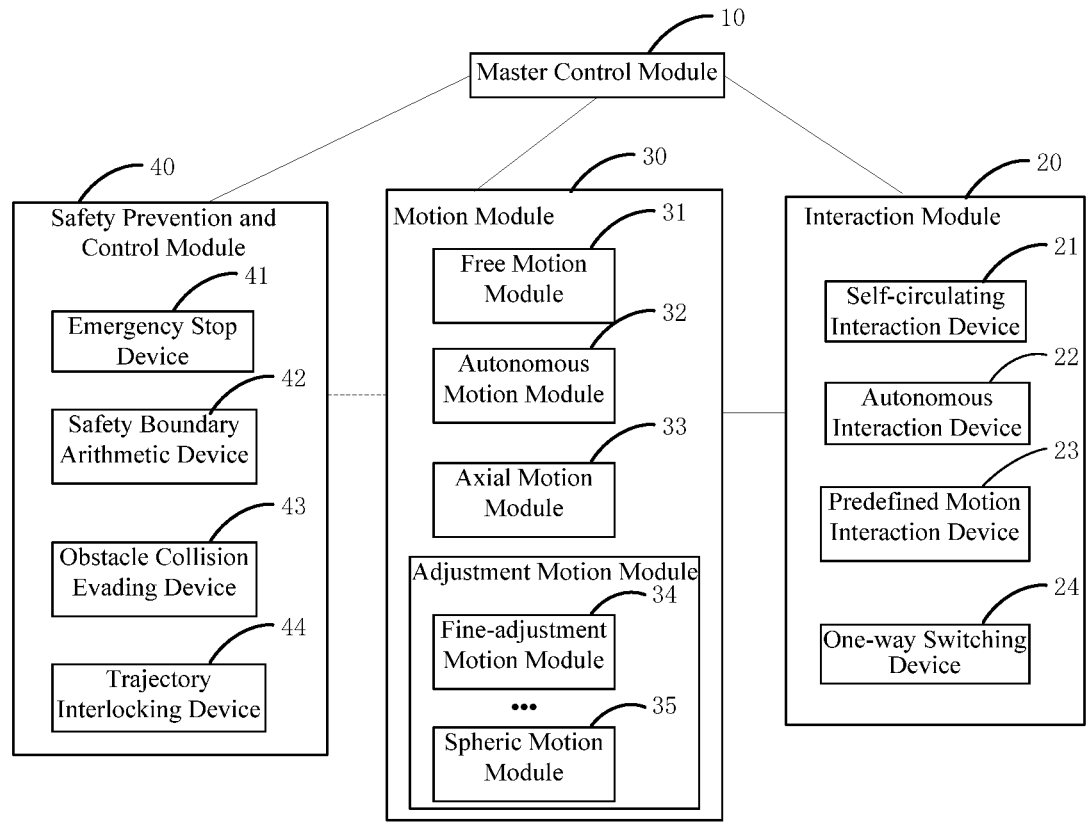
FIG. 6 is a schematic view showing the surgical robot control system according to another embodiment of this application.

Referring to FIG. 6, FIG. 6 is a schematic view showing a surgical robot control system 100 according to another embodiment of this application. During the motion of the mechanical arm of the surgical robot, a main safety risk introduced during exercise is the possibility of accidental collision to the patient's head, or to the cart itself. Therefore, the surgical robot control system 100 provided in this application provides the following corresponding security design scheme based on identified safety risks.

In an embodiment, the safety prevention and control system 40 includes an emergency stop device 41.

The emergency stop device 41 is in information interactions with each of the plurality of motion modules 30. A user prevents the mechanical arm from continuing moving via the emergency stop device 41 when the user determines that there is a safety risk to the movement of the mechanical arm. Specifically, the emergency stop device 41 may be the foot pedal that is in an information interaction with the mechanical arm. Conventionally, during operation of the surgical robot, only when the user presses the foot pedal, can various motion modules 30 be triggered. When the user determines that there is a safety risk to the movement of the mechanical arm, the user may release the foot pedal at first to prevent all movements of the mechanical arm. In an embodiment, only when the user continues to step on the foot pedal during operations of the free motion module 31, the autonomous motion module 32, the axial motion module 33, the fine-adjustment motion module 34, and the spheric motion module 35, can they each complete a corresponding motion process.

In an embodiment, the safety prevention and control system 40 further includes a safety boundary arithmetic device 42.

The safety boundary arithmetic device 42 is in information interactions with each of the free motion module 31, the axial motion module 33, and the spheric motion module 35. The safety boundary arithmetic device 42 is configured to warn the user of a safety risk when it is found that an actual motion trajectory is about to reach the security boundary according to a real-time comparison between the actual motion trajectory of the mechanical arm and a predefined security boundary.

In this embodiment, for the manual dragging movements of the free motion module 31, the axial motion module 33, the spheric motion module 35, and the like, the master control module 10 cannot know all motion trajectories in advance, but can compare the actual motion trajectory with the predefined security boundary in real time. When the master control module 10 finds that the actual motion trajectory is about to reach the security boundary, the user may be prompted by a warning, a voice, or the like. When the actual motion trajectory reaches the security boundary again, the master control module 10 may control the safety boundary arithmetic device 42 to prevent the movement of the mechanical arm, thereby avoiding further safety risks. It should be noted that only when the warning is confirmed by the user, is it possible to drag the mechanical arm by the user to move within the range of the security boundary. For the axial motion module 33, a safety boundary in the depth direction needs to be further defined according to a length of the surgical instrument and a length of the adapter, so as to ensure that the instrument or the terminal of the adapter, which is in the axial direction motion mode and under manual dragging of the user, will not collide with the patient's head.

In an embodiment, the safety prevention and control system 40 further includes an obstacle collision evading device 43.

The obstacle collision evading device 43 is in an information interaction with the autonomous motion module 32. The obstacle collision evading device 43 is configured to generate a simplified obstacle model based on a system hardware model and an unknown-patient head model. When the master control module 10 plans a path point for the autonomous motion module 32, the obstacle collision evading device 43 generates an evasion path that may evade the simplified obstacle model. For the case that the autonomous motion module 32 may plan a path trajectory in advance, when planning the path, the system avoids a collision interference in advance and evade the collision under the condition that a cart model, a patient head model, and instrument models of other instruments are obtained.

The simplified obstacle model may be simplified to be a combination of the following three categories of models. The first category of model is a model of a system cart, an instrument, or a component that is in the cart and may be collided. After a mechanical design is completed, such models have solidified, and may be exported through a dedicated software, and are called grid files and used for collision tests during a path planning. The second category of model is the unknown-patient head model, which may be acquired by CT scan of a preoperative radiographic image prior to a surgery and finally transferred to a collision test algorithm in a slave computer to perform collision tests. The third category of model is a head frame model of numerous unknown head frames of a third party, which are used for fixing the head, and such a category of model may be an encasing box model obtained by extending outwardly for approximate 20 mm to 60 mm on the basis of the obtained patient head model and a known model of mechanical assembly of the system used for fixing the patient's head. That is, no part of the mechanical arm can enter the encasing box.

In an embodiment, the safety prevention and control system 40 further includes a trajectory interlocking device 44.

The trajectory interlocking device 44 is in information interactions with each of the plurality of motion modules 30. The trajectory interlocking device 44 is configured to monitor the motion trajectory of the mechanical arm in real time, and warn the user or directly prohibit the movement of the mechanical arm when it is found that a deviation between the actual motion trajectory of the mechanical arm and the planned motion trajectory is greater than a preset deviation. Specifically, when it is found that the deviation between the actual path trajectory and the planned path trajectory is relatively large, a warning is issued in advance or the motion of the mechanical arm is prohibited in advance. The relatively large deviation may mean that the deviation between the actual motion trajectory of the mechanical arm and the planned motion trajectory is greater than the preset deviation. Since the deviation between the actual motion trajectory and the planned motion trajectory is relatively large (for example, a Euclidean distance exceeds 1 cm), there must be some unpredictable anomalies resulting in an increased possibility of a final collision which may be evaded in advance.

The surgical robot control system 100 of another embodiment of this application further includes a velocity selecting device, a locking and unlocking device, a motion enabling device, and an automatic returning device. The velocity selecting device may set different motion velocities for the motion modules 30 in different motion states. The locking and unlocking device may lock and control different motion states of the motion modules 30. The motion enabling device may perform an emergency stop process on the motion modules 30 in different motion states. The automatic returning device may control the motion module 30 to return from different motion states to an initial position.

This application also provides a surgical robot control method including following steps.

A user demand is received, and an interactive control command is generated. In these steps, the interaction module 20 above may be configured to receive the user demand and generate the interactive control command.

A motion control command is generated according to the interactive control command. In this step, the master control module 10 above may be configured to generate the motion control command.

The terminal of the mechanical arm is controlled to perform the motion control command, and the motion control command includes controlling the terminal of the mechanical arm to act in accordance with a plurality of motion modes. In this step, the plurality of motion modules 30 above may be configured to execute the plurality of motion modes, respectively.

In this embodiment, the surgical robot control method may implement different motion schemes in various clinical application scenarios, and in any application scenario, the interactive control command may be generated through receiving the user demand; the motion control command is generated according to the interactive control command; the terminal of the mechanical arm is controlled to perform the motion control command, and the motion control command includes controlling the terminal of the mechanical arm to act in accordance with the plurality of motion modes, so that the surgical robot control method may realize flexible switching between the plurality of motion modes. Specifically, during the treatment of the spinal diseases by using the surgical robot having the mechanical arm based on the seven-degree-of-freedom force sensor, the free motion mode may be switched to the axial direction motion mode, and after the terminal of the mechanical arm moves to a first anchor point, the axial direction motion mode may be switched to the fine-adjustment motion mode, and the terminal of the mechanical arm moves slowly to a second anchor point, and then specific surgical procedures are performed according to the surgical protocol. The second anchor point is closer to an affected part than the first anchor point is.

In an embodiment, in the steps of the controlling the terminal of the mechanical arm to perform the motion control command, and the motion control command including controlling the terminal of the mechanical arm to act in accordance with the plurality of motion modes, the plurality of motion modes include: a free motion mode, an autonomous motion mode, an axial motion mode, a fine-adjustment motion mode, and a spheric motion mode. In the free motion mode, the terminal of the mechanical arm may be controlled to make a free motion. In the autonomous motion mode, an autonomous motion may be performed according to path points planned by the master control module 10. In the axial direction motion mode, the terminal of the mechanical arm may be controlled to move in a predefined axial direction. In the fine-adjustment motion mode, the terminal of the mechanical arm may be controlled to move for a predetermined distance in a fixed direction in a predefined plane. In the spheric motion mode, the terminal of the mechanical arm may be controlled to move along a predefined spherical surface.

In an embodiment, the motion control command includes any one or more of the following four control commands:
control each of the plurality of motion modes to be performed circularly for several times;
control interactions between the autonomous motion mode and each of the free motion mode, the axial motion mode, the fine-adjustment motion mode, and the spheric motion mode to be performed;
control a two-way interaction between the axial motion mode and the fine-adjustment motion mode, a two-way interaction between the axial motion mode and the spheric motion mode, and a two-way interaction between the fine-adjustment motion mode and the spheric motion mode to be performed; or
control a one-way switching of each of the axial motion mode, the fine-adjustment motion mode, and the spheric motion mode to the free motion mode to be performed.

In this embodiment, reference may be made to a logic diagram of flexible switching between different motion modules, and FIG. 4 shows that various motion systems in the plurality of motion modes may be flexibly switched to each other according to actual clinical application scenarios.

In an embodiment, the robot control method further includes performing an information interaction with at least one of the plurality of motion modes to realize a safety prevention and control for the surgical robot control system.

In this embodiment, the step of the safety prevention and control is added, so that, in any application scenarios, the robot control method may achieve the flexible switching between the motion modes, and a safe and reliable real-time motion function of the mechanical arm. In addition, the surgical robot control method of this embodiment, which may be applied to a multi-mode motion system and motion schemes of the mechanical arm having a flexible and reliable control strategy and high security, is not only applicable to a stereotactic surgical robot, but also applicable to a surgical robot, which is based on six-degree-of-freedom force sensor mechanical arm or seven-degree-of-freedom force sensor mechanical arm and used in an orthopedic or spinal-type treatment such as a joint replacement, a bone injury treatment, and the like.

In an embodiment, the step of realizing the safety prevention and control for the surgical robot control system includes implementing the safety prevention and control for the surgical robot by using any one or more of the following steps:

executing an emergency stop control on the mechanical arm, issuing a warning of a safety risk to the user, generating an automatic evasion path for the mechanical arm, and prohibiting a motion of the mechanical arm.

Specifically, the executing the emergency stop control on the mechanical arm may be that, when the user determines that there is a safety risk in the motion of the mechanical arm, the user may prevent the mechanical arm from continuing moving via the emergency stop device 41.

The issuing the warning of the safety risk to the user may be warning the user of the safety risk, when it is found, based on a real-time comparison of the actual motion trajectory of the mechanical arm with a predefined security boundary, that the actual motion trajectory is about to reach the security boundary.

The generating the automatic evasion path for the mechanical arm may include: generating a simplified obstacle model based on a system hardware model and an unknown-patient head model, and when the master control module 10 has planned a path point of the autonomous motion module 32, generating, by the obstacle collision evading device 43, the evasion path that may evade the simplified obstacle model.

The prohibiting the motion of the mechanical arm may include: monitoring the motion trajectory of the mechanical arm in real time, and warning the user or directly prohibiting the movement of the mechanical arm when it is found that a deviation between the actual motion trajectory of the mechanical arm and the planned motion trajectory is greater than a preset deviation.

This application also provides a surgical robot including the surgical robot control system 100 of any one of the above embodiments, a mechanical arm, a ground brake, a foot pedal, an imaging device, and other hardware devices.

Figure 7:
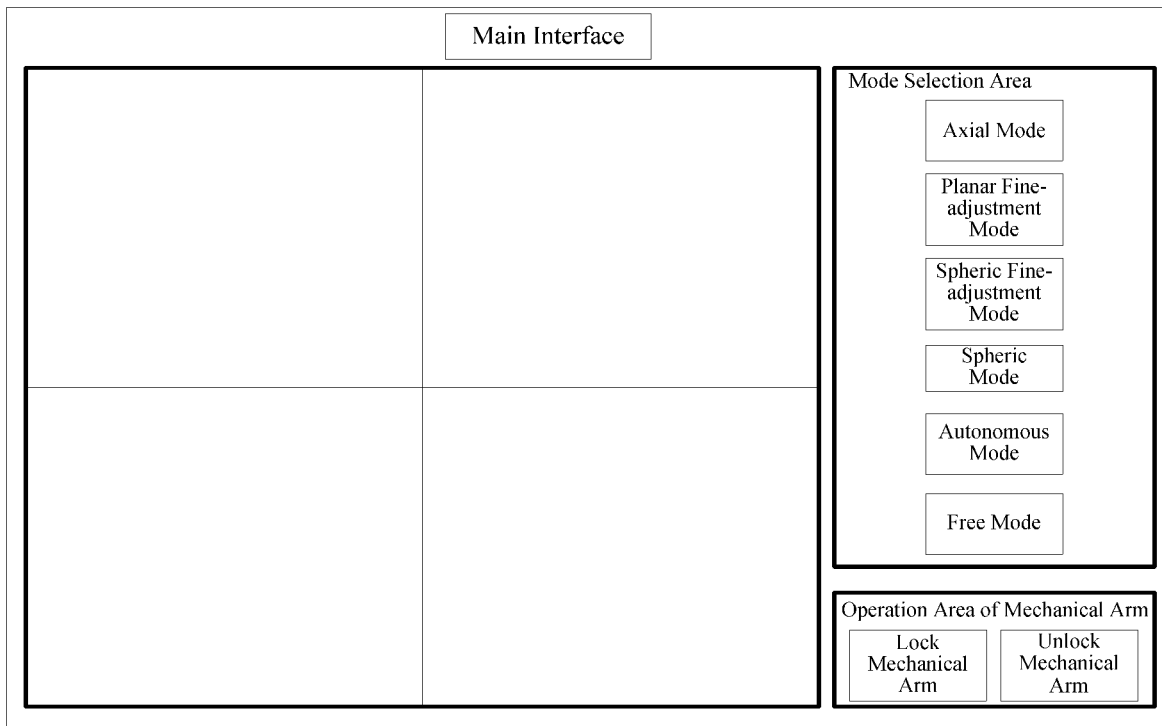
FIG. 7 shows a main interface of a plurality of motion modules according to an embodiment of this application.

Referring to FIG. 7, FIG. 7 shows a main interface of a plurality of motion modules 30 in the master control module 10 in an embodiment of this application. This application further provides interfaces of the two motion modules namely the axial motion module 33 and the fine-adjustment motion module 34 in the master control module 10 to show an operation process of the two motion modules, respectively.

Figure 8:
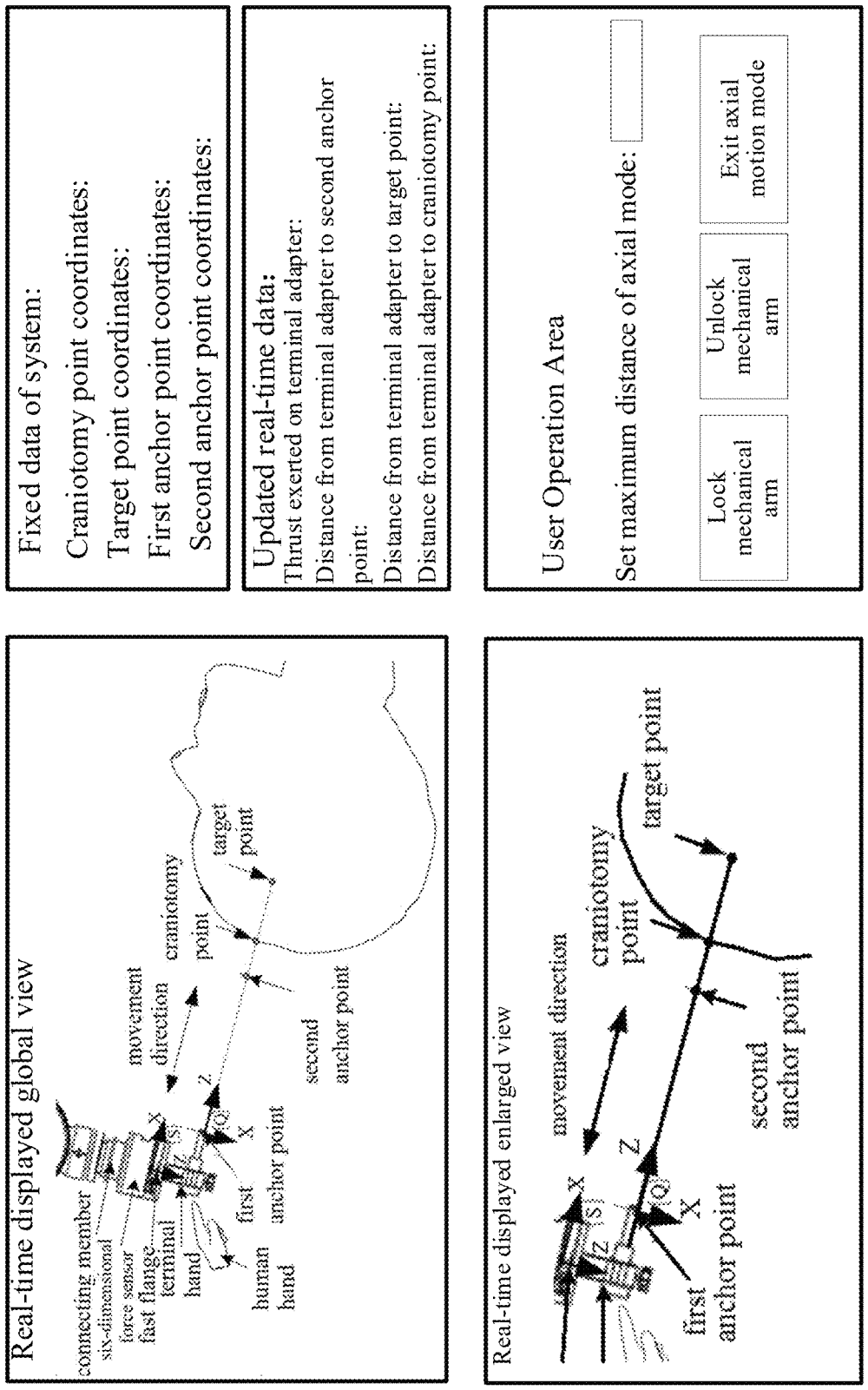
FIG. 8 shows an interface of an axial motion module according to an embodiment of this application.

Referring to FIG. 8, FIG. 8 shows an interface of the axial motion module 33 according to an embodiment of this application. An operation method for the interface is as follows.

A distance from the first anchor point to a target point is determined, which is completed by preoperative planning. Step on the foot pedal (start the movement of the mechanical arm), and the mechanical arm is controlled to move to the first anchor point by using the free motion module 31, the autonomous motion module 32, or a combined motion module of the free motion module 31 and the autonomous motion module 32.

The master control module 10 may display various categories of information, including image information, fixed data information, real-time data information, and operation information. The image information may be one image or multiple images displayed simultaneously. The fixed data information and the real-time data information may be directly displayed on the image information, or may be displayed in a separate display area. The operation information may be used for the user to input information, may be directly displayed on the image information, or may be displayed in the separate display area.

In a specific embodiment, an "axial mode" is selected from the main interface of the master control module 10, and the system enter a subpage of the "axial mode". When the user is required to manually adjust the axial position of the terminal instrument, a global real-time dynamic display is shown in the image information display area according to the positions of the terminal instrument and the head. As shown in FIG. 8, the motion mode interface of the axial motion module 33 contains information of two views, which are a real-time displayed global view and a real-time displayed enlarged view, respectively. The information of two views is used for displaying an overall positional relationship, where the human's head is a scanned CT image, and the mechanical arm, the instrument and the human's hand are models in STL data format or in preset 3D data format thereof. When the user is required to manually adjust the axial position of the terminal instrument, the image information display area shows a global real-time dynamic display according to the positions of the terminal instrument and the head, and shows a movement direction of the puncture axis, the first anchor point, the second anchor point, a current terminal instrument point, a craniotomy point, a target point, etc. The enlarged view is also displayed in the image information display area in real time, and mainly enlarges an area including the movement direction of the puncture axis, the second anchor point, the current terminal instrument point, and the craniotomy point. The enlarged view may be dynamically adjusted and enlarged according to the position of the current terminal instrument point, or the user may manually adjust and enlarge a partial view.

As shown in FIG. 8, the motion mode interface of the axial motion module 33 further includes a display area of fixed data information. The "craniotomy point coordinate", "target point coordinate", "first anchor point coordinate", and "second anchor point coordinate" may be displayed in the display area of fixed data information.

As shown in FIG. 8, the motion mode interface of the axial motion module 33 further includes a display area of real-time data information. For example, data of a thrust (N) exerted on a terminal adapter indicates that a force is applied to the instrument by the user; coordinates of the origin Q of the coordinate system of the terminal instrument to coordinates of the second anchor point are displayed in real time; coordinates of the origin Q of the coordinate system of the terminal instrument to coordinates of the craniotomy point are displayed in real time; coordinates of the origin point Q of the coordinate system of the terminal instrument to coordinates of the target point are displayed in real time. The coordinate values in this embodiment are displayed with respect to the coordinates of the target point, or may be displayed with respect to any other coordinate system. Types of displayed coordinates include, but are not limited to, rectangular and spherical coordinates. What displayed in the display area of the real-time data information may include all or part of the displayed contents mentioned above.

As shown in FIG. 8, the motion mode interface of the axial motion module 33 further includes a display area of operation information. The user himself/herself may set a maximum distance of the axial mode. The user may also select "lock mechanical arm", "unlock mechanical arm", or "exit axial motion mode". To lock the mechanical arm may allow the user to perform other operations more safely without worrying about other abnormal movements of the mechanical arm. When the user desires an axial motion mode, the user may unlock the mechanical arm, or exit the current axial motion mode. In principle, the axial motion interface is a main interface of motion module, but the sub-interface may still contain some of the functions of the main interface. For example, if the user does not want to return to the main interface to switch the motion mode (e.g., the autonomous motion mode, etc.), switching to other motion modes may be performed directly in the sub-interface.

Figure 9:
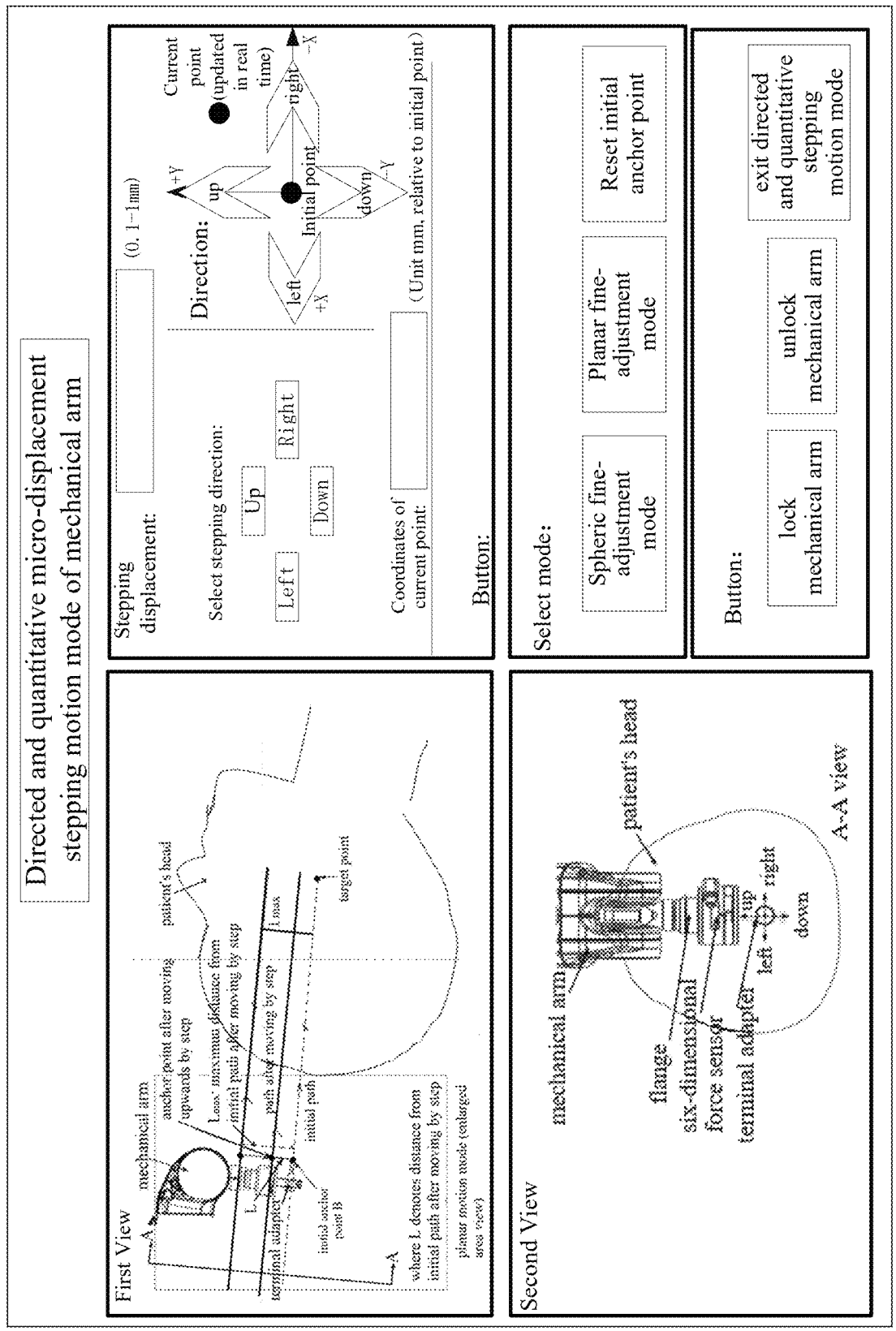
FIG. 9 shows an interface of planar fine-adjustment in a fine-adjustment motion module according to an embodiment of this application.
Figure 10:
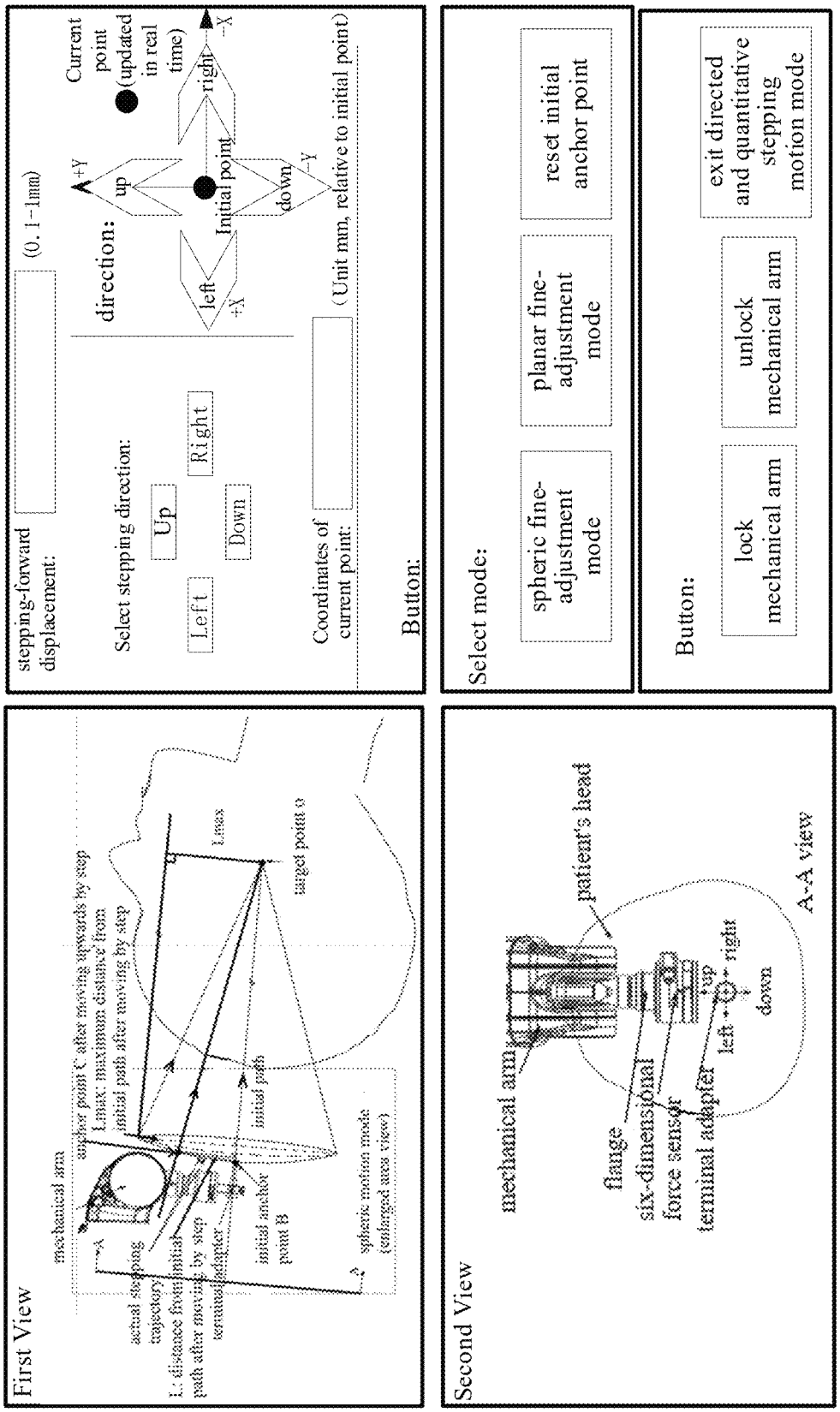
FIG. 10 shows an interface of spheric fine-adjustment in the fine-adjustment motion module according to an embodiment of this application.

Referring to FIGS. 9 and 10, FIG. 9 shows an interface of planar fine-adjustment in a fine-adjustment motion module 34 according to an embodiment of this application, and FIG. 10 shows an interface of spheric fine-adjustment in the fine-adjustment motion module 34 according to an embodiment of this application. FIG. 9 is taken as an example to illustrate an operation method for an interface of the fine-adjustment motion module 34:

A distance from the first anchor point to the target point is determined, which is completed by preoperative planning. Step on the foot pedal, and the mechanical arm is controlled to move to the first anchor point by the selected autonomous motion module 32, or a selected combined motion module of the free motion module 31 and the autonomous motion module 32.

A "planar fine-adjustment mode' or a "spheric fine-adjustment mode" on the main interface of the master control module 10 is selected, and the system enters a sub-page of the "fine-adjustment mode". The "fine-adjustment mode" may be further selected between the "planar fine-adjustment mode" and the "spheric fine-adjustment mode". As shown in FIG. 9, the motion mode interface of the fine-adjustment motion module 34 includes image information, data information, and operation information. The image information display area contains information of two views, which are a real-time displayed global view (a first view) and a real-time displayed enlarged view (a second view), respectively.

The display area of the data information includes an inputting area of a stepped displacement and a display area of position after stepping. After the user inputs the step size, selects the motion mode, and unlocks the mechanical arm, the fine-adjustment motion may start.

The display area of the data information further includes stepping direction keys. The stepping direction keys include but are not limited to the keys in the interface of this embodiment, and they may include physical up, down, left, right keys or corresponding voice recognition, etc. In the direction view, the coordinates of the current position after stepping with respect to the initial position, etc., are displayed in real time, and the relative value information is displayed in real time. The coordinate values in this embodiment are displayed with respect to the coordinates of the initial anchor point, or may be displayed with respect to any other coordinate system. Types of displayed coordinates include, but are not limited to, rectangular and spherical coordinates, etc.

The display area of the operation information includes a mode selection and switching area, in which the planar fine-adjustment mode or the spheric fine-adjustment mode may be freely switched to each other, and in which a "reset initial anchor point" may be clicked to reset to the initial anchor point.

The display area of the operation information further includes a control key, and the user may lock the mechanical arm after using the step mode, so that other surgical operations may be performed more safely. The user may also make multiple successive steps up to the desired puncture site. When the fine-adjustment mode is completed, the user may click "exit directed and quantitative stepping motion mode" of a micro-displacement to enter the main interface of FIG. 7.

Figure 11:
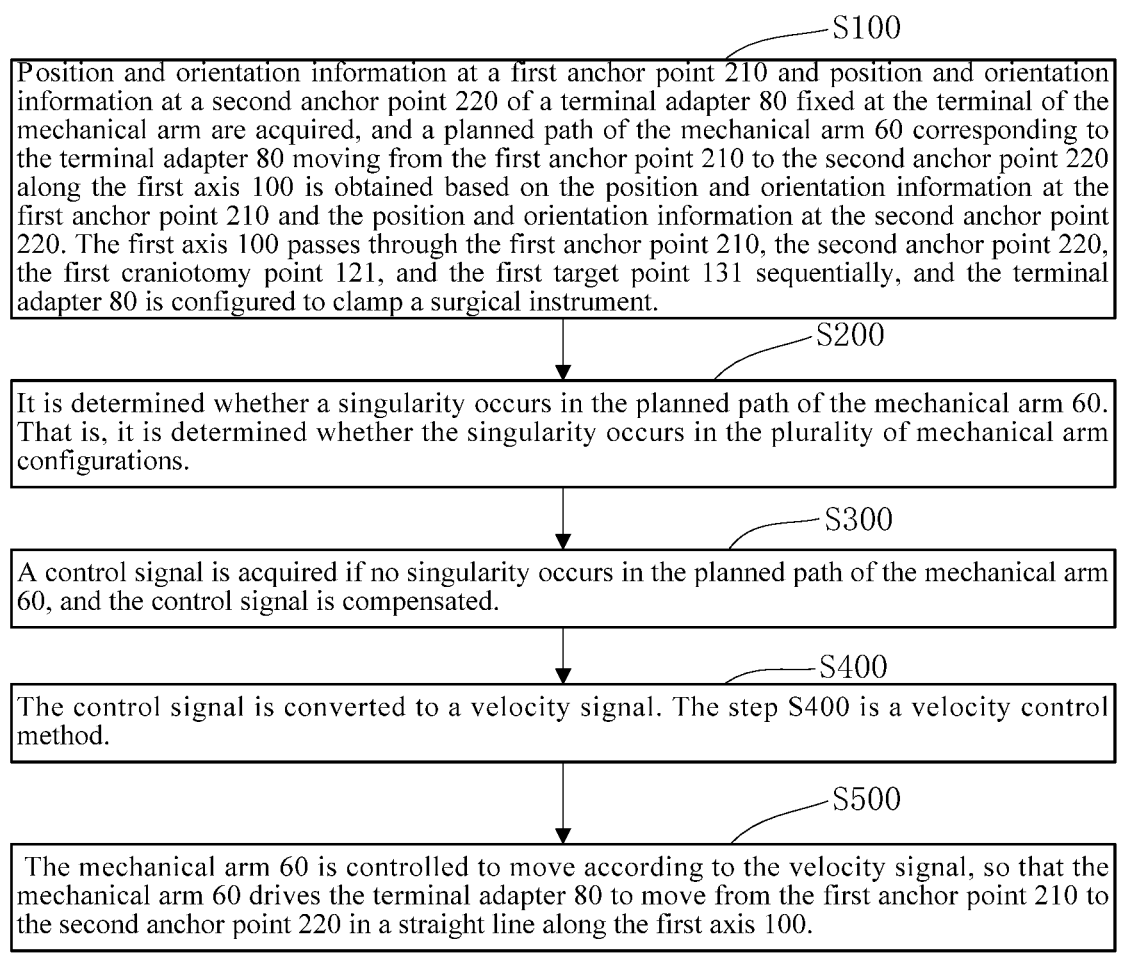
FIG. 11 is a schematic flow chart of a surgical robot control method according to an embodiment of this application.
Figure 12:
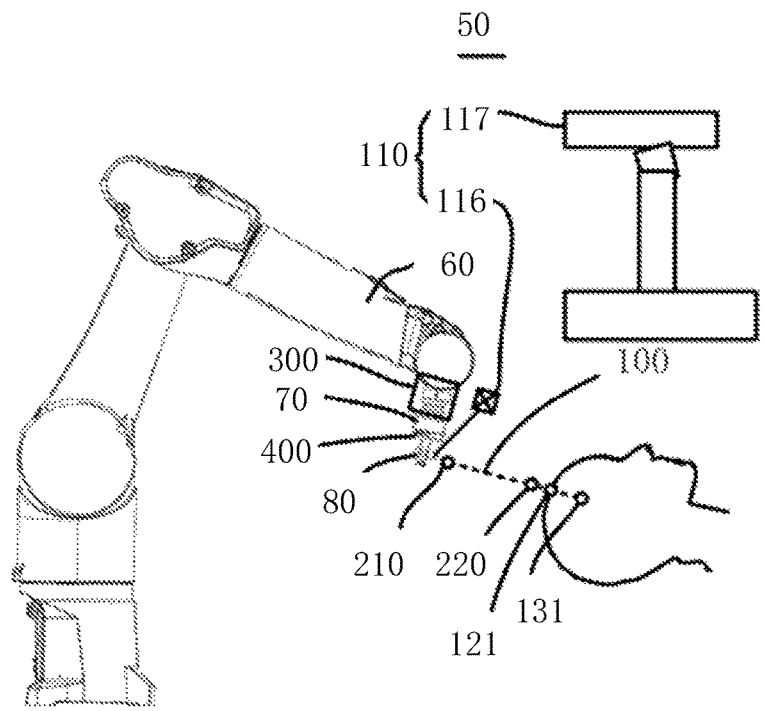
FIG. 12 is a schematic view showing a structure of the surgical robot system according to an embodiment of this application.

Referring to FIGS. 11 and 12, an embodiment of this application provides a surgical robot control method, including following steps.

At step S100, position and orientation information at a first anchor point 210 and position and orientation information at a second anchor point 220 of a terminal adapter 80 fixed at the terminal of the mechanical arm are acquired, and a planned path of the mechanical arm 60 corresponding to the terminal adapter 80 moving from the first anchor point 210 to the second anchor point 220 along the first axis 100 is obtained based on the position and orientation information at the first anchor point 210 and the position and orientation information at the second anchor point 220. The first axis 100 passes through the first anchor point 210, the second anchor point 220, the first craniotomy point 121, and the first target point 131 sequentially, and the terminal adapter 80 is configured to clamp a surgical instrument.

The mechanical arm 60 includes a plurality of members. Two adjacent members are connected by a joint, which enables the two members to rotate relative to each other. One end of the mechanical arm 60 is fixed to the base, and another end of the mechanical arm 60 is fixedly connected to the terminal adapter 80. The terminal adapter 80 is configured to install a surgical instrument. The surgical instrument includes a scalpel, an electric drill, or other surgical instruments.

When the mechanical arm 60 drives the terminal adapter 80 to move from the first anchor point 210 to the second anchor point 220 in a straight line along the first axis 100, the mechanical arm 60 are transformed into different configurations. The relative positions of the plurality of members in different configurations are different. The planned path of the mechanical arm 60 includes a plurality of mechanical arm configurations.

A distance between the second anchor point 220 and the first craniotomy point 121 is a safe distance. When the terminal adapter 80 moves along the first axis 100, the terminal adapter 80 does not clamp the surgical instrument. When the surgical instrument is the electric drill, a drilling bit of the electric drill has a certain length. In order to prevent the installed drilling bit from touching the skull, the safe distance is set. After the mechanical arm 60 drives the terminal adapter 80 to move to the second anchor point 220, the terminal adapter 80 is not allowed to move close to the first craniotomy point 121.

In an embodiment, before the step S100, the control method further includes a step S010.

At step S010, a maximum displacement is set, one end point of the maximum displacement is the first anchor point 210, and the other end of the maximum displacement is set between the first anchor point 210 and the second anchor point 220. The mechanical arm 60 drives the terminal adapter 80 to move only within an interval corresponding to the maximum displacement.

In an embodiment, if the maximum displacement is not set, a distance between a current position at which the terminal adapter 80 is located and the first anchor point 210 is the maximum displacement by default. That is, the terminal adapter 80 can only move away from the first craniotomy point 121 along the first axis 100.

The maximum displacement is set to make lengths of different surgical instruments applicable and to ensure the safety of the operation.

At step S200, it is determined whether a singularity occurs in the planned path of the mechanical arm 60. That is, it is determined whether the singularity occurs in the plurality of mechanical arm configurations.

In an embodiment, the mechanical arm 60 includes a first member, a second member, and a third member. The first member and the second member are connected by a first joint. The second member and the third member are connected by a second joint. In one of the mechanical arm configurations with singularity, a speed of the first member connected at the first joint and a speed of the third member connected at the second joint are equal and in opposite directions. Speeds of both ends of the second member are equal and in opposite directions, and the second member cannot move. In this case, the mechanical arm configuration generates the singularity. When deriving a velocity based on the displacement of a joint, a matrix has singularity. If the singularity occurs in the mechanical arm configuration, the velocity of the joint cannot be accurately controlled.

At step S300, a control signal is acquired if no singularity occurs in the planned path of the mechanical arm 60.

The control signal may be a force signal exerted on the mechanical arm 60 or on the terminal adapter 80 by a person, or may be an electrical signal applied by an external control device. In an embodiment, the control signal may be compensated. Affected by a position of a signal acquisition device and by an intermediate device, the control signal acquired by the signal acquisition device needs to be compensated to eliminate influences of environmental factors or influences of other devices on the control signal, thereby improving the control accuracy of the terminal adapter 80.

At step S400, the control signal is converted to a velocity signal. The step S400 is a velocity control method. In an embodiment, the compensated control signal may be converted to the velocity signal.

At step S500, the mechanical arm 60 is controlled to move according to the velocity signal, so that the mechanical arm 60 drives the terminal adapter 80 to move from the first anchor point 210 to the second anchor point 220 in a straight line along the first axis 100.

The surgical robot control method allows the mechanical arm 60 and the terminal adapter 80 to move close to the first target point 131 or move away from the first target point 131 along the first axis 100 only, and does not allow the terminal adapter 80 to move in other directions.

When the mechanical arm 60 drives the terminal adapter 80 to move close to the first target point 131, the surgical robot control method may improve the positioning accuracy of the surgical instrument reaching the first craniotomy point 121. When the mechanical arm 60 drives the terminal adapter 80 to move away from the first target point 131, greater operating space may be provided for installing the surgical instrument on the terminal adapter 80.

The mechanical arm 60 drives the terminal adapter 80 to move between the first anchor point 210 and the second anchor point 220. When the terminal adapter 80 is used to drill a hole in the skull, it will not drill too deep to wound cortical tissues.

The surgical robot control method provided in the embodiment of this application, based on the judgement of the singularity of the planned path, controls the mechanical arm 60 to move by using the velocity control method in the case that no singularity occurs. The velocity control method controls the mechanical arm 60 and the terminal adapter 80 to move at corresponding velocities under the control of the velocity signal. Compared with a position (joint position) control method, the velocity control method makes the mechanical arm 60 and the terminal adapter 80 move smoother.

In an embodiment, after the step S200, the surgical robot control method further includes following steps.

At step S210, the control signal is acquired if the singularity occurs in the planned path of the mechanical arm 60.

In an embodiment, the step S210 further includes a step of compensating the control signal.

At step S220, the control signal is converted to a joint point signal.

In an embodiment, the step S220 further includes converting the compensated control signal to the joint point signal.

At step S230, the mechanical arm 60 is controlled to move according to the joint point signal, so that the mechanical arm 60 drives the terminal adapter 80 to move between the first anchor point 210 and the second anchor point 220 in a straight line along the first axis 100.

When the singularity occurs in the planned path of the mechanical arm 60, there is a case that singularity occurs in the mechanical arm configuration. In this case, the velocity control method is inconvenient to control the velocity of the joint and tends to cause the velocity to be out of control. Therefore, when the singularity occurs in the planned path of the mechanical arm 60, the position control method is used to control the mechanical arm 60 and the terminal adapter 80 to move, thereby improving the safety of the surgical robot.

In an embodiment, prior to the step S220, the control method further includes:

taking a real-time collision test.

In an embodiment, the control signal includes an operation force signal exerted on the terminal adapter 80. In an embodiment, the step S300 includes a step of compensating the control signal. The step of compensating the control signal in the S300 step includes:

compensating the operation force signal to eliminate influences of environment and other devices.

In an embodiment, a signal acquisition device is a signal sensing device 70. The signal sensing device 70 is fixed to the terminal of the mechanical arm 60. The terminal adapter 80 is fixedly mounted to a side of the signal sensing device 70 away from the terminal of the mechanical arm 60. The terminal adapter 80 and the signal sensing device 70 are connected by the second connecting member 400. The signal sensing device 70 is connected to the terminal of the mechanical arm 60 by the first connecting member 300.

The signal sensing device 70, the terminal adapter 80, the first connecting member 300, and the second connecting member 400 each have a weight. When the position and orientation of the terminal of the mechanical arm 60 and the position and orientation of the terminal adapter 80 are changed, there will be a weight component along the first axis 100, thus affecting the accuracy of the operation force signal. Accordingly, the operation force signal needs to be compensated to eliminate the effects of the weights of the signal sensing device 70, the terminal adapter 80, the first connecting member 300, and the second connecting member 400 on the operation force signal.

The step S400 includes following steps.

The compensated operation force signal is converted to obtain a first velocity.

The first velocity is projected on the first axis 100 to obtain a second velocity, and the terminal adapter 80 is forced to move at the second velocity along the first axis 100.

In an embodiment, the first velocity is a velocity in the Cartesian coordinate system. The first velocity includes components in the directions of three axes. The first axis 100 is a Z-axis in the Cartesian coordinate system.

The step S500 includes following steps.

At step S510, a position information of the terminal adapter 80 is acquired, and a collision test is performed for the mechanical arm 60 according to the position information of the terminal adapter 80 and the second velocity.

At step S520, the terminal adapter 80 is controlled to move between the first anchor point 210 and the second anchor point 220 at the second velocity, if no collision occurs to the mechanical arm 60.

Steps S510 and S520 prevent the mechanical arm 60 from colliding with other objects while the mechanical arm 60 is driving the terminal adapter 80 to move, thereby improving the safety of the surgical robot.

Figure 13:
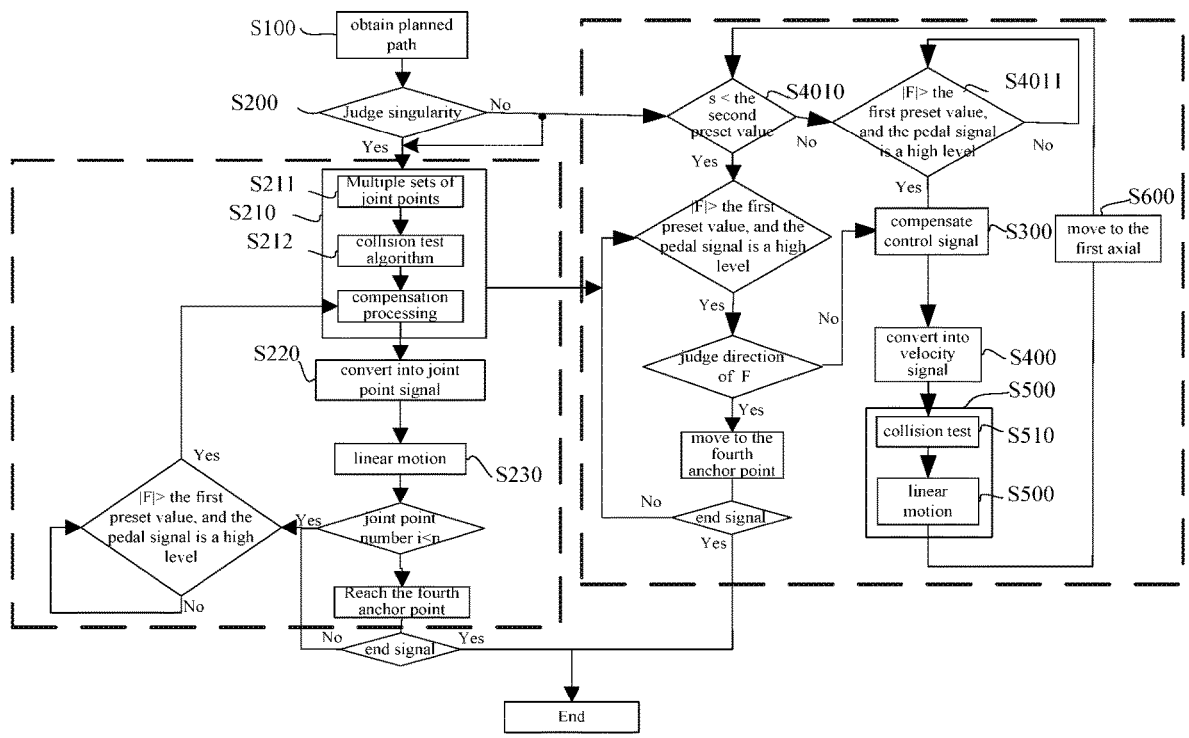
FIG. 13 is a schematic flow chart of the surgical robot control method according to another embodiment of this application.

Referring to FIG. 13, in an embodiment, the control signal further includes a pedal signal, and prior to the step of compensating the operation force signal, the surgical robot control method further includes the following step.

At step S4011, it is determined whether the operation force signal is greater than a first preset value and the pedal signal is a high level, and if the operation force signal is greater than the first preset value and the pedal signal is a high level, the step of compensating the operation force signal is performed. In FIG. 13, F denotes the operation force signal.

Only when the operation force signal is greater than the first preset value and the pedal signal is at a high level, is the step of converting the compensated operation force signal to obtain the first velocity performed, thereby avoiding a misoperation caused by a misinput signal.

In an embodiment, prior to the step S4011, the surgical robot control method further includes the following step.

At step S4010, it is determined whether a distance between the terminal adapter 80 and the second anchor point 220 is less than a second preset value, and if yes, and if it is determined that the operation force signal is greater than the first preset value and that the pedal signal is a high level, a direction of the operation force signal is determined. If the direction of the operation force signal is away from the second anchor point 220, the step of acquiring the operation force signal of the terminal adapter 80 and the step of compensating the operation force are performed.

The terminal adapter 80 moves between the first anchor point 210 and the second anchor point 220. When the distance between the terminal adapter 80 and the second anchor point 220 is greater than the second preset value, the terminal adapter 80 is relatively far away from the second anchor point 220, and in this case, the velocity control method is used and has high controllability and causes no danger.

The distance between the terminal adapter 80 and the second anchor point 220 is less than the second preset value. When the operation force signal is configured to force the terminal adapter 80 to move away from the second anchor point 220, the terminal adapter 80 is relatively far away from the first anchor point 210, and the velocity control method is used to control the movement of the terminal adapter 80 and causes no danger. In FIG. 13, S represents the distance between the terminal adapter 80 and the second anchor point 220.

In the previous embodiment, when the distance between the terminal adapter 80 and the second anchor point 220 is less than the second preset value, when the operation force signal is greater than the first preset value, and when the pedal signal is a high level, the terminal adapter 80 is controlled to move to the second anchor point 220 if the direction of the operation force signal directs toward the second anchor point 220.

When the distance between the terminal adapter 80 and the second anchor point 220 is relatively small, and when it is not easy to control the position of the terminal adapter 80 by the velocity control method, the displacement control method is used to directly control the terminal adapter 80 to move to the second anchor point 220, thereby improving the safety.

In an embodiment, the control signal includes the operation force signal exerted on the terminal adapter 80, and the step of compensating the control signal in step S210 includes:

compensating the operation force signal.

Prior to the step of acquiring the control signal and compensating the control signal in the step S210, the surgical robot control method further includes following steps.

At step S211, multiple sets of information of joint points of the mechanical arm 60 needing to move are obtained according to the planned path of the mechanical arm 60.

The path planning of the mechanical arm 60 includes a plurality of mechanical arm configurations. Each of the mechanical arm configurations corresponds to a set of information of joint points. The plurality of mechanical arm configurations correspond to the multiple sets of information of joint points.

In an embodiment, a line segment between the first anchor point 210 and the second anchor point 220 on the first axis 100 is divided by an interpolation method into a plurality of joint points in a joint space, to which the terminal adapter 80 moves.

Information of the plurality of joint points to which the terminal adapter 80 moves is in a one-to-one correspondence to multiple sets of information of joint points of the mechanical arm 60. That is, the mechanical arm 60 changes into one mechanical arm configuration every time the terminal adapter 80 moves to one joint point.

At step S212, a collision test is performed for the mechanical arm 60 according to the multiple sets of information of the joint points, so as to prevent the mechanical arm 60 from colliding with other objects.

The step S230 includes:

acquiring position information and joint points signals of the terminal adapter 80.

Information of the joint points of the mechanical arm 60 needing to move under the action of the operation force signal is obtained according to the position information and the joint points signals of the terminal adapter 80.

The mechanical arm 60 is controlled to move according to the information of the joint points needing to move, and the terminal adapter 80 is driven to move in a straight line along the first axis 100.

Based on the position information of the terminal adapter 80, the mechanical arm configuration and the information of joint points corresponding to the mechanical arm configuration may be obtained. Based on the information of the joint points corresponding to the current mechanical arm configuration and the compensated operation force signal, the mechanical arm configuration, into which the mechanical arm 60 needs to change under the action of the operation force signal, and the information of the joint points corresponding to the mechanical arm configuration, may be calculated. By solving the information of the joint points and by using the joint point position control method to control the terminal adapter 80 to move, the movement position of the terminal adapter 80 is more accurate.

In an embodiment, after the step of controlling the mechanical arm 60 to move according to the information of the joint points needing to move, and driving the terminal adapter 80 to move in the straight line along the first axis 100, the surgical robot control method further includes following steps.

The number of joint points traversed by the terminal adapter 80 is calculated. The number of joint points traversed by the terminal adapter 80 corresponds to the positions of the terminal adapter 80.

Calculating the number of joint points traversed by the terminal adapter 80 is obtaining current position information of the terminal adapter 80.

In FIG. 13, i denotes the number of joint points traversed by the terminal adapter 80. n denotes a total number of the joint points.

It is determined whether the number of joint points traversed by the terminal adapter 80 is less than a total number of joint points that needs to be traversed by the terminal adapter 80 moving from the first anchor point 210 to the second anchor point 220, and if the number of joint points traversed by the terminal adapter 80 is less than the total number of joint points, return to the step of compensating the operation force signal.

That the number of joint points traversed by the terminal adapter 80 is less than the total number of joint points means that the terminal adapter 80 is not located at the second anchor point 220.

In the previous embodiment, the surgical robot control method further includes:
determining whether the operation force signal is greater than a first preset value, and the pedal signal is a high level; if yes, returning to the step of controlling the mechanical arm 60 to move according to the information of the joint points needing to move, and driving the terminal adapter 80 to move in the straight line along the first axis 100.

The surgical robot control method avoids no signal input and misoperation by the step of determining whether the operation force signal and the pedal signal simultaneously reach a preset condition.

In an embodiment, the signal sensing device 70 is connected to the terminal adapter 80 by the second connecting member 400. The signal sensing device 70 is connected to the terminal of the mechanical arm 60 by the first connecting member 300. The terminal adapter 80 is configured to be connected with the surgical instrument.

After the step S300 of acquiring the control signal, the surgical robot control method further includes following steps.

The control signal is filtered to eliminate an influence of noise.

Masses and centers of masses of the signal sensing device 70, the terminal adapter 80, the first connecting member 300, and the second connecting member 400 are acquired.

The step of compensating the control signal includes:
compensating the control signal according to the masses and the centers of masses of the signal sensing device 70, the terminal adapter 80, the first connecting member 300, and the second connecting member 400.

Since the surgical instrument, the first connecting member 300 and the second connecting member 400 have different influences on the terminal adapter 80 when the positions and orientations of the terminal of the mechanical arm 60 are different, the control signal needs to be compensated in real time in different positions and orientations, so as to measure the operation force more accurately.

After the compensation, the force vector in the coordinate system of the signal sensing device 70 is transformed into the force vector in the coordinate system of the terminal adapter 80 through a transition matrix.

In an embodiment, after the step S500, the surgical robot control method further includes the following step.

At step S600, if the distance between the terminal adapter 80 and the first axis 100 is greater than a third preset value, the terminal adapter 80 is controlled to move to the first axis 100 to ensure that the terminal adapter 80 moves along the first axis 100.

In an embodiment, the terminal adapter 80 is controlled to move to the first axis 100 in a direction perpendicular to the first axis 100, to ensure that a distance the terminal adapter 80 moves to the first axis 100 is the shortest.

In a velocity mode, the addition of the step S600 ensures that the position of the instrument at the terminal is always on the planned path, and that the direction of movement is always in the planned direction.

When no external force is applied, the mechanical arm stops moving, and the S600 step enables the terminal adapter to be always on the first axis 100, that is, the terminal adapter is always on the planned path, which ensures the accuracy (of position and direction) of the operation.

In an embodiment, if no force is applied to the terminal adapter 80, the terminal adapter is locked, to ensure the safety of the operation.

The position control method is also applicable to the case that no singularity occurs in the planned path of the mechanical arm 60.

In an embodiment, the surgical robot control method further includes:
receiving an ending signal, and ending the control.

In an embodiment, the surgical robot control method further includes:
controlling the terminal adapter 80 to move to the first anchor point 210 in a way of collaboration or automatically.

Referring to FIG. 14, in an embodiment, when a singularity occurs in the planned path of the mechanical arm 60, the step of controlling the mechanical arm 60 to drive the terminal adapter 80 to move between the first anchor point 210 and the second anchor point 220 in a straight line along the first axis 100 by using the velocity control method includes following steps.

A control signal is acquired and the control signal is compensated.

The step S400 is performed to force the mechanical arm 60 to drive the terminal adapter 80 to move between the first anchor point 210 and the second anchor point 220 in the straight line along the first axis 100.

When the mechanical arm 60 moves to change into a singular configuration, the directions of the velocities of the joint points of the mechanical arm 60 are changed, and the sizes of the velocities of the joint points of the mechanical arm 60 are limited.

After the mechanical arm 60 leaves from the singular configuration, the position and the velocity of the mechanical arm 60 are corrected, so that the terminal adapter 80 moves to the first axis 100.

In an embodiment, the direction of the second velocity of the joint points of the mechanical arm 60 are changed by a method solving a pseudo-inverse matrix of Jacobi, and the speeds of the joint points of the mechanical arm 60 are limited.

In an embodiment, after the step S400 is performed, the step S500 is further performed.

An embodiment of this application provides a computer device including a memory and a processor. A computer program is stored in the memory. The processor, when executing the computer program, performs the steps of the method described in any one of the above embodiments. By restricting the terminal adapter 80 to moving between the first anchor point 210 and the second anchor point 220 in a straight line along the first axis 100, the computer device provided by the embodiment of this application reduces calculations for the other two degrees of freedom during the movement of the terminal adapter 80, thereby reducing the amount of calculation, and improving the working efficiency of the robot.

In addition, the computer device, based on the judgement of the singularity of the planned path, controls the motion of the mechanical arm 60 by using the velocity control method in the case that no singularity occurs. The velocity control method controls the mechanical arm 60 and the terminal adapter 80 to move at corresponding velocities under the control of the velocity signal. Compared with the computer device using the position control method, the computer device using the velocity control method makes the mechanical arm 60 and the terminal adapter 80 move smoother.

An embodiment of this application provides a surgical robot system 50, which includes a mechanical arm 60, a signal sensing device 70, a terminal adapter 80, and a control device. The signal sensing device 70 is fixed to the terminal of the mechanical arm 60. The terminal adapter 80 is fixedly mounted to the signal sensing device 70. The terminal adapter 80 is configured to have a surgical instrument mounted thereon and receive a control signal. The control device includes a memory and a processor. A computer program is stored in the memory. The processor, when executing the computer program, performs the steps of the method of any one of the above-described embodiments.

By restricting the terminal adapter 80 to moving between the first anchor point 210 and the second anchor point 220 in the straight line along the first axis 100, the surgical robot system 50 reduces calculations for the other two degrees of freedom during the movement of the terminal adapter 80, thereby reducing the amount of calculation, and improving the working efficiency of the robot.

In addition, the surgical robot system 50, based on the judgement of the singularity of the planned path, controls the motion of the mechanical arm 60 by using the velocity control method in the case that no singularity occurs. The velocity control method controls the mechanical arm 60 and the terminal adapter 80 to move at corresponding velocities under the control of the velocity signal. Compared with the surgical robot system 50 using the position control method, the surgical robot system 50 using the velocity control method makes the mechanical arm 60 and the terminal adapter 80 move smoother.

In an embodiment, the surgical robot system 50 further includes a first connecting member 300 and a second connecting member 400. The first connecting member 300 is connected between the signal sensing device 70 and the terminal adapter 80 to facilitate removal and replacement of the terminal adapter 80. The second connecting member 400 is connected to the terminal adapter 80 and the terminal of the mechanical arm 60 to facilitate removal and replacement of the signal sensing device 70.

In an embodiment, the surgical robot system 50 further includes an optical monitoring device 110. The optical monitoring device 110 includes an optical element 116 and a detector 117. The optical element 116 is disposed at the terminal adapter 80, and the optical element 116 is configured to generate an optical signal. The detector 117 is electrically connected to the detector 117. The detector 117 is configured to receive the optical signal, detect the position information of the terminal adapter 80 through the optical signal, and output the position information to the control device.

In a robot-assisted surgery, a surgeon has a patient's brain scanned. Based on a scanned image, the surgeon may determine relevant information of a focus of a disease. The surgeon formulates a surgical protocol according to the relevant information of the focus of the disease and other information of the patient's brain. Multiple puncture paths are included in the surgical protocol. Each puncture path includes information such as a target point of the puncture path, a craniotomy point location, a diameter of the path, or a length of the instrument. The target point is positioned at the focus of the disease, and the craniotomy point is positioned on the skull surface of the patient. The puncture path is also referred to as a path of the needle track. In a process of puncturing, the terminal adapter 80 of the mechanical arm 60 needs to be positioned nearby the craniotomy point before the surgeon performs a puncturing operation.

Figure 16:
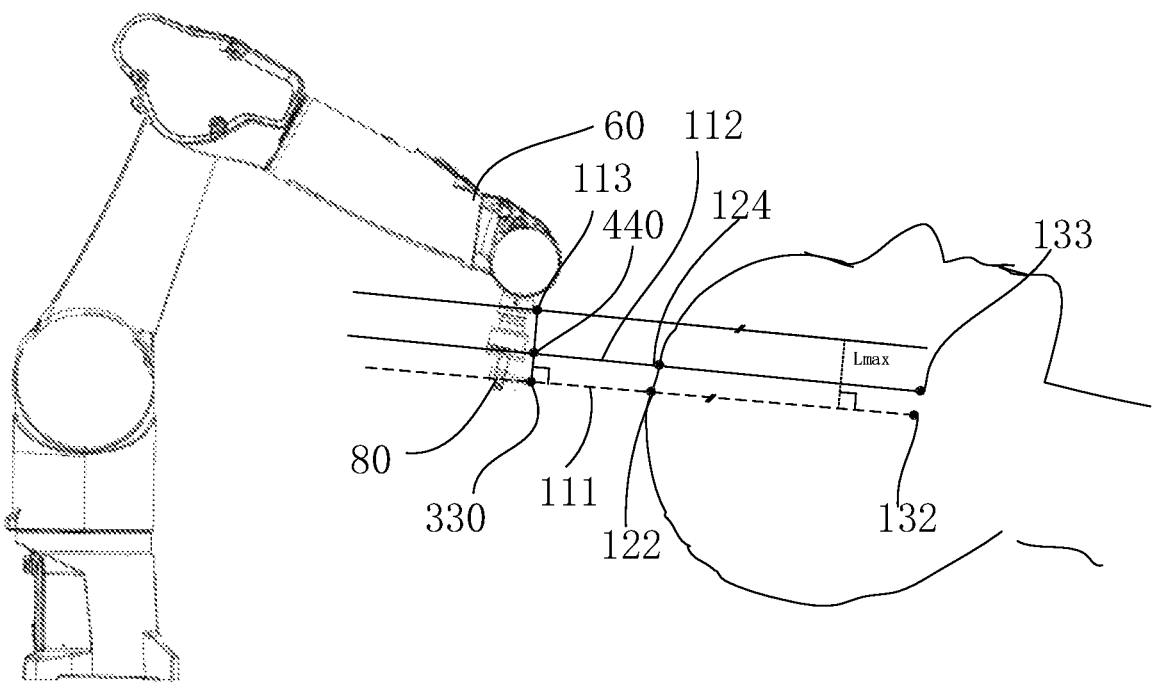
FIG. 16 is a schematic view showing a plane mode of the terminal adapter of the mechanical arm according to an embodiment of this application.

Referring to FIGS. 15 and 16, an embodiment of this application provides a control method for a terminal adapter 80 of a mechanical arm 60, and the control method includes following steps.

At step S1000, a first path 111 is acquired. The first path 111 passes through a second target point 132 and a second craniotomy point 122, and the terminal adapter 80 is located at a third anchor point 330. The first path 111 passes through the third anchor point 330, the second craniotomy point 122, and the second target point 132 in sequence.

At step S2000, a position command is obtained, and according to the position command, the terminal adapter 80 is controlled to move along a first plane or a first spherical surface in which the third anchor point 330 is located. The first plane is perpendicular to the first path 111.

The control method for the terminal adapter 80 of the mechanical arm 60 provided by the embodiment of this application controls the terminal adapter 80 to move along the first plane or the first spherical surface in which the third anchor point 330 is located, and the first plane is perpendicular to the first path 111, thereby reducing the degrees of the freedom of the movement of the terminal adapter 80, avoiding remodeling, data acquisition and path planning, and saving time. Even if the position of the target point is changed for several times, a new puncture path may be quickly obtained, thereby improving the efficiency of the surgery.

The position command includes mode information, distance information, direction information, step size information, etc.

In an embodiment, if the position command includes position information of the third target point 133, the step of controlling the terminal adapter 80 to move along the first plane in which the third anchor point 330 is located according to the position command includes following steps.

At step S2100, a second path 112 passing through the third target point 133 is obtained according to the position information of the third target point 133 and the first path 111. The second path 112 is parallel to the first path 111.

At step S2200, the terminal adapter 80 is driven to move to a fourth anchor point 440.

By locating the third target point 133 position, and obtaining the second path 112 parallel to the first path 111 according to the position information of the third target point 133 and the first path 111, the control method for the terminal adapter 80 of the mechanical arm 60 provided by the embodiment of this application avoids the remodeling, the data acquisition and the path planning, and saves the time. Even if the position of the target point is changed for several times, the new puncture path may be quickly obtained, thereby improving the efficiency of the surgery.

The position information of the third target point 133 may include movement direction information or a target position information or the like.

The second target point 132 is an original target point. The second craniotomy point 122 is an original craniotomy point. The third target point 133 is a new target point obtained by correcting the original target. A fourth craniotomy point 124 is a new craniotomy point obtained by correcting the original craniotomy point. The first path 111 is an original puncture path, and the second path 112 is a new puncture path.

The terminal adapter 80 is configured to install a surgical instrument. The surgical instrument includes a scalpel, an electric drill, or other surgical instruments.

The terminal adapter 80 moves to the third anchor point 330 manually or automatically.

The step of obtaining the second path 112 passing through the third target point 133 according to the position information of the third target point 133 and the first path 111 in the step S2100 includes:

making a straight line going through the third target point 133 and parallel to the first path 111. The straight line is a straight line in which the second path 112 is located.

The terminal adapter 80 may move to the straight line along a straight line or a curve.

In an embodiment, the control method for the terminal adapter 80 of the mechanical arm 60 further includes the following step.

At step S410, a safe distance is obtained. The safe distance is a minimum distance between the terminal adapter 80 and the fourth craniotomy point 124. The terminal adapter 80 is controlled to be locked when the distance between the terminal adapter 80 and the fourth craniotomy point 124 is the safe distance.

In an embodiment, the surgical instrument is the electric drill. After the electric drill is installed on the terminal adapter 80, the terminal adapter 80 is controlled to drive the electric drill to drill a hole at the fourth craniotomy point 124.

In an embodiment, the step S300 of driving the terminal adapter 80 to move to the fourth anchor point 440 includes the following step.

The terminal adapter 80 is driven to move to the fourth anchor point 440 in a direction perpendicular to the first path 111. The distance the terminal adapter 80 moves perpendicularly to the fourth anchor point 440 is the minimum distance, thereby shortening the surgical preparation time, and improving the work efficiency.

After the step of driving the terminal adapter 80 to move to the fourth anchor point 440 in the direction perpendicular to the first path 111, the control method further includes the following step.

The terminal adapter 80 is controlled to move along the second path 112.

Figure 17:
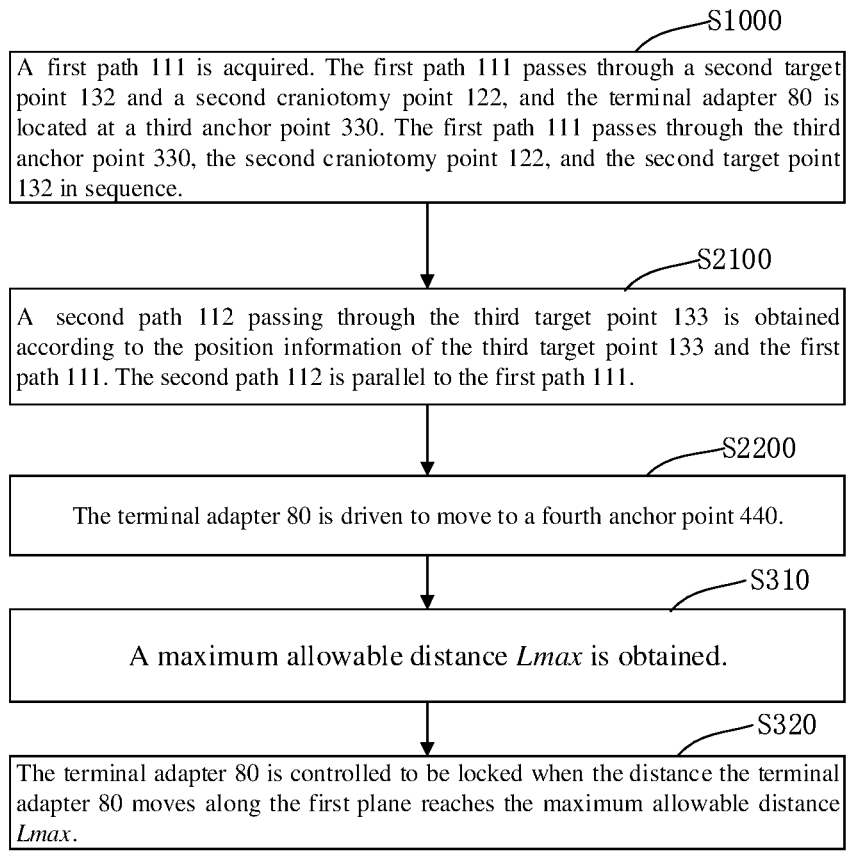
FIG. 17 is a flow chart of the control method of the terminal adapter of the mechanical arm according to an embodiment of this application.

Referring to FIG. 17, in an embodiment, after the step S2200, the control method for the terminal adapter 80 of the mechanical arm 60 further includes following steps.

At step S310, a maximum allowable distance Lmax is obtained.

At step S320, the terminal adapter 80 is controlled to be locked when the distance the terminal adapter 80 moves along the first plane reaches the maximum allowable distance Lmax.

The maximum allowable distance Lmax is the maximum displacement that the terminal adapter 80 is allowed to move in the direction perpendicular to the first path 111. The distance the terminal adapter 80 moves is a radial distance between the position of the terminal adapter 80 and the third anchor point 330.

In an embodiment, the terminal adapter 80 is controlled to move along a straight line perpendicular to the first path 111, therefore the moving range of the terminal adapter 80 is a circular area taking the third anchor point 330 as a center point and taking the maximum allowable distance Lmax as a radius. The plane in which the circular area is located is perpendicular to the first path 111. The point on the edge of the circular area is a first limit point 113. The distance between the first limit point 113 and the third anchor point 330 is the maximum allowable distance Lmax. That is, the terminal adapter 80 can move only in the circular area.

The projected area of the circular area projected on the skull of the patient is an area in which a correction of the craniotomy point is allowed.

The maximum allowable distance Lmax is related to the position of the original target and the tissue structure nearby the original target. A projected area of the circular area, which corresponds to the maximum allowable distance Lmax and is projected on the head of the patient, is a safe area. When a surgeon punches a skull or removes the focus of the disease in the safe area, other brain tissues will not be damaged or will be damaged a little.

The maximum allowable distance Lmax is relatively small generally. The maximum allowable distance Lmax is between 5 mm and 10 mm.

In an embodiment, a technician's manual operation for the terminal adapter 80 is acceptable, but the terminal adapter 80 is allowed to move only in a direction perpendicular to the first path 111. The technician may manually operate the terminal adapter 80 to move freely within the circular area.

In an embodiment, the step of driving the terminal adapter 80 to move to the fourth anchor point 440 in the direction perpendicular to the first path 111 includes the following step.

The control method for the terminal adapter 80 of the mechanical arm 60 controls the terminal adapter 80 to move in a step-by-step moving manner, so that the position information of the terminal adapter 80 may be accurately obtained by recording the number of steps, thereby reducing an information delay and improving security.

A first step size is less than the maximum allowable distance Lmax. The first step size is between 0.1 mm and 1 mm.

Figure 18:
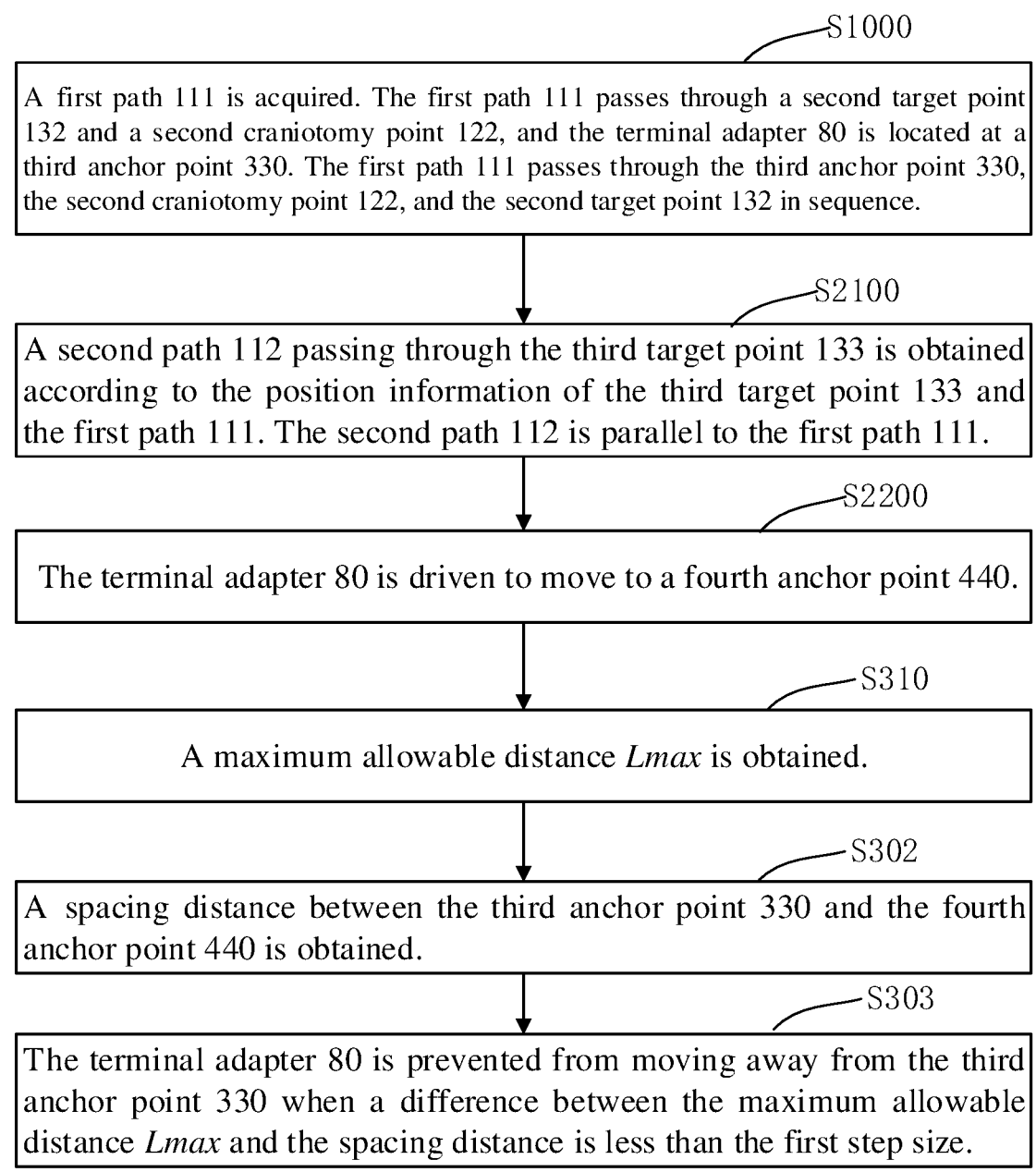
FIG. 18 is a flow chart of the control method of the terminal adapter of the mechanical arm according to another embodiment of this application.

Referring to FIG. 18, in an embodiment, after the step S300, the control method for the terminal adapter 80 of the mechanical arm 60 further includes following steps.

At step S310, the maximum allowable distance Lmax is obtained.

At step S302, a spacing distance between the third anchor point 330 and the fourth anchor point 440 is obtained.

At step S303, the terminal adapter 80 is prevented from moving away from the third anchor point 330 when a difference between the maximum allowable distance Lmax and the spacing distance is less than the first step size. That is, the terminal adapter 80 can move only towards the third anchor point 330 or does not move, thus preventing the terminal adapter 80 from moving beyond the maximum allowable distance Lmax, and protecting the brain from being damaged due to the terminal adapter 80 moving beyond the safe area.

In an embodiment, when the difference between the maximum allowable distance Lmax and the spacing distance is less than the first step size and greater than the second step size, the terminal adapter 80 is controlled to move step by step with the second step size. The second step size is smaller than the first step size.

The step of preventing the terminal adapter 80 from moving away from the third anchor point 330 is performed when the difference between the maximum allowable distance Lmax and the spacing distance is less than the second step size.

By adjusting and reducing the step size of the terminal adapter 80, the step-by-step moving range of the terminal adapter 80 may be increased to obtain a larger correction space for the craniotomy point and the target point.

In the above-mentioned embodiment, the motion mode of the terminal adapter 80 is a planar fine-adjustment mode. The terminal adapter 80 moves perpendicularly to the fourth anchor point 440, and then moves along the second path 112 parallel to the first path 111. Both the craniotomy point and the target point are corrected.

Figure 19:
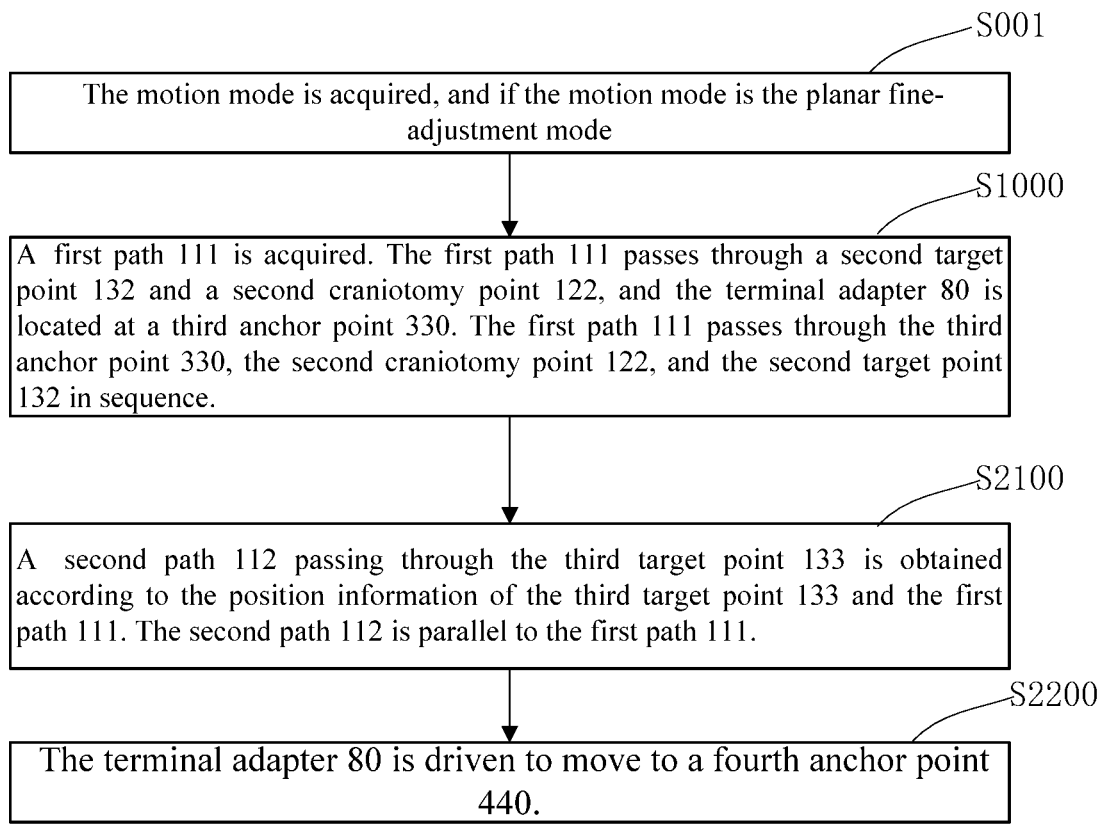
FIG. 19 is a flow chart of the control method of the terminal adapter of the mechanical arm according to yet another embodiment of this application.

Referring to FIG. 19, in an embodiment, prior to the step of obtaining the first path 111, the following step is further included.

At step S001, the motion mode is acquired, and if the motion mode is the planar fine-adjustment mode, the step of acquiring the first path 111 is performed.

Figure 20:
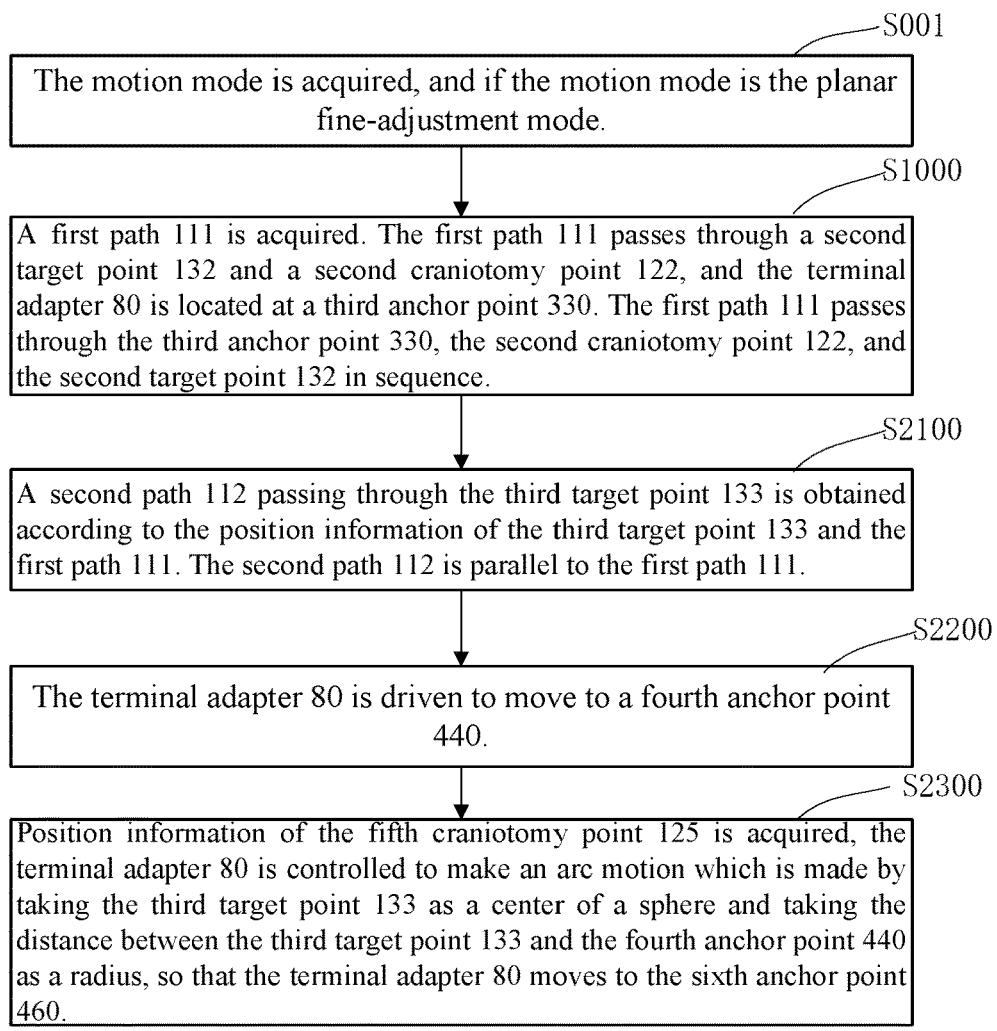
FIG. 20 is a flow chart of the control method of the terminal adapter of the mechanical arm according to yet another embodiment of this application.
Figure 21:
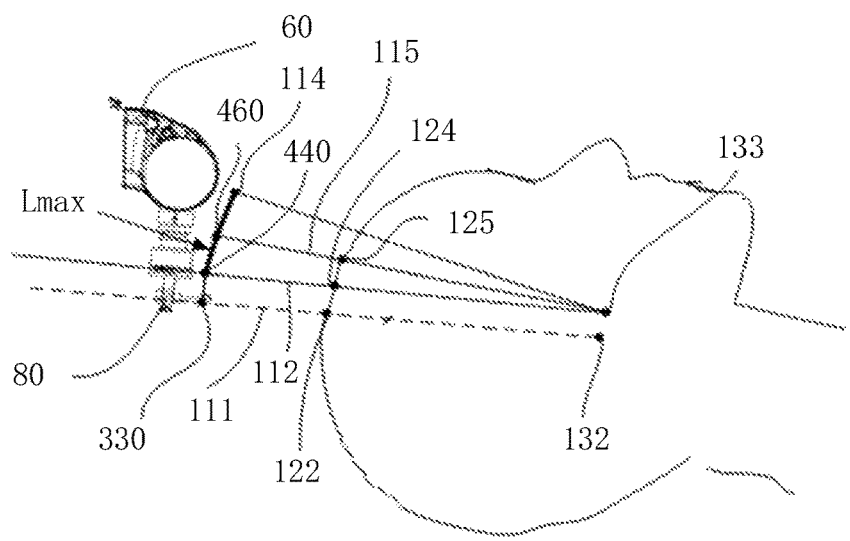
FIG. 21 is a schematic view showing a switching from the plane mode to the spheric mode of the terminal adapter of the mechanical arm according to an embodiment of this application.

Referring to FIGS. 20 and 21, in an embodiment, if the motion mode is switched from the planar fine-adjustment mode to the spheric fine-adjustment mode after the step of driving the terminal adapter 80 to move to the fourth anchor point 440, then following steps are included.

At step S2300, position information of the fifth craniotomy point 125 is acquired, the terminal adapter 80 is controlled to make an arc motion which is made by taking the third target point 133 as a center of a sphere and taking the distance between the third target point 133 and the fourth anchor point 440 as a radius, so that the terminal adapter 80 moves to the sixth anchor point 460. The third target point 133, the fifth craniotomy point 125, and the sixth anchor point 460 are sequentially arranged on the same straight line.

If the terminal adapter 80 makes the arc motion which is made by taking the third target point 133 as the center of the sphere and taking the distance between the third target point 133 and the fourth anchor point 440 as the radius, the range of movement of the terminal adapter 80 in the spheric fine-adjustment mode is partial spherical surface. The center of the sphere is the third target point 133, and the radius of the sphere is the distance between the third target point 133 and the fourth anchor point 440.

The line connecting the third target point 133 and the fifth craniotomy point 125 is a third path 115. An intersection of the third path 115 and the patient's skull is a puncture target. The puncture target is denoted by the fifth craniotomy point 125.

In an embodiment, after the step of driving the terminal adapter 80 to move to the fourth anchor point 440, the control method further includes controlling the terminal adapter 80 to move a distance along the second path 112 and then switching the motion mode to the spheric fine-adjustment mode.

By switching the motion mode, the position of the craniotomy point may be changed, thus selectively evading important brain tissues between the craniotomy point and the target point to improve the safety of the operation.

Figure 22:
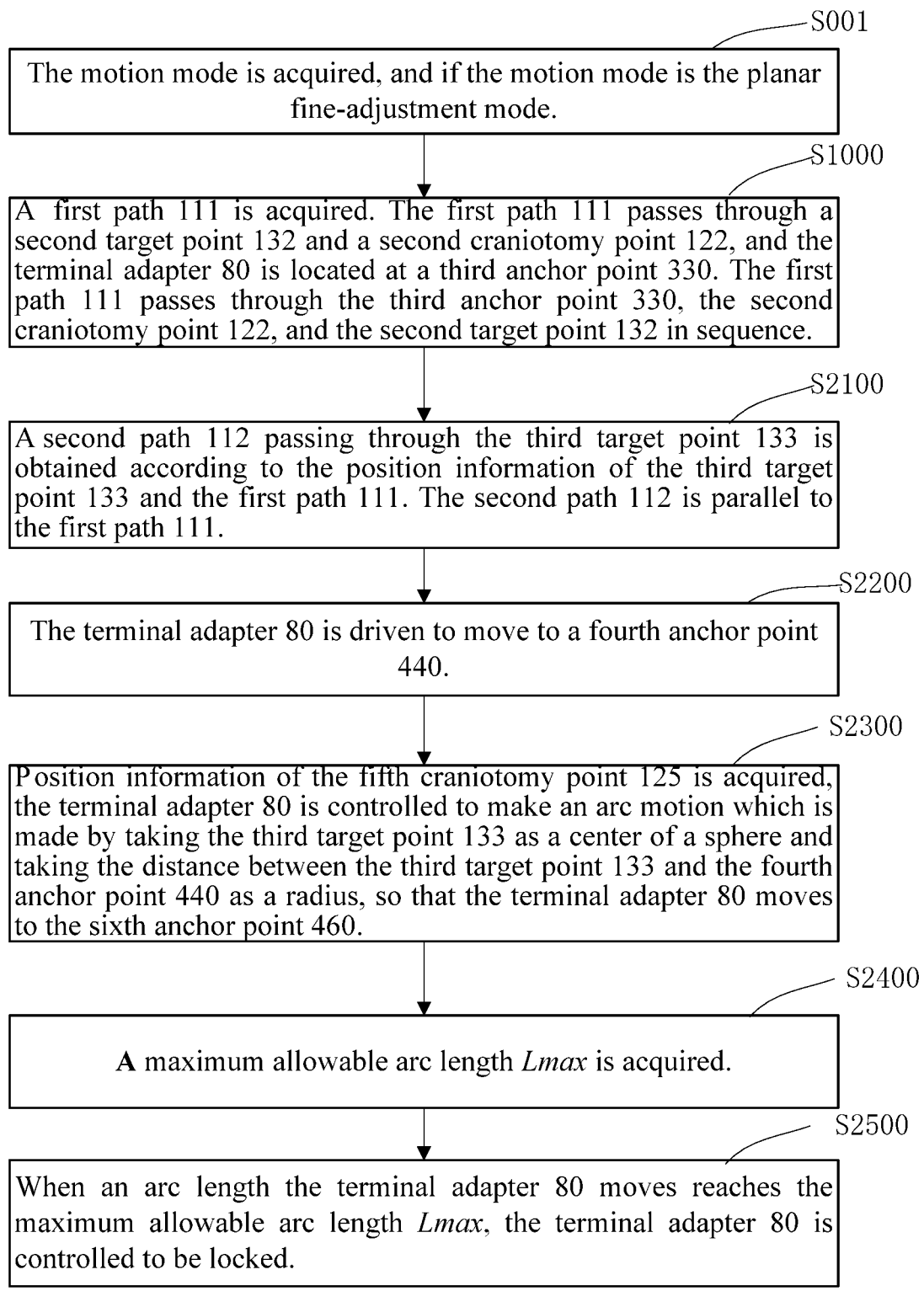
FIG. 22 is a flow chart of the control method of the terminal adapter of the mechanical arm according to another embodiment of this application.

Referring to FIG. 22, in an embodiment, the control method for the terminal adapter 80 of the mechanical arm 60 further includes following steps.

At step S2400, a maximum allowable arc length Lmax is acquired.

At step S2500, when an arc length the terminal adapter 80 moves reaches the maximum allowable arc length Lmax, the terminal adapter 80 is controlled to be locked, so as to ensure the safety of the position of the craniotomy point of the puncture operation.

The maximum allowable arc length Lmax is a maximum displacement of an arc motion which is made by taking the third target point 133 as the center of the sphere and taking the distance between the third target point 133 and the fourth anchor point 440 as the radius.

In FIG. 21, an arc length between the fourth anchor point 440 and the sixth anchor point 460 is the maximum allowable arc length Lmax. The maximum allowable arc length Lmax is related to the position of the original target and the tissue structure of the brain.

In an embodiment, the step of controlling the terminal adapter 80 to make the arc motion, which is made by taking the third target point 133 as the center of the sphere and taking the distance between the third target point 133 and the fourth anchor point 440 as the radius, to force the terminal adapter 80 to move to the sixth anchor point 460 includes:

controlling the terminal adapter 80 to move to the sixth anchor point 460 step by step with the first arc length.

The control method for the terminal adapter 80 of the mechanical arm 60 controls the terminal adapter 80 to move in the step-by-step moving manner, thus making it convenient to accurately acquire the position information of the terminal adapter 80 by recording the number of steps, reducing the information delay, and improving the security.

Figure 23:
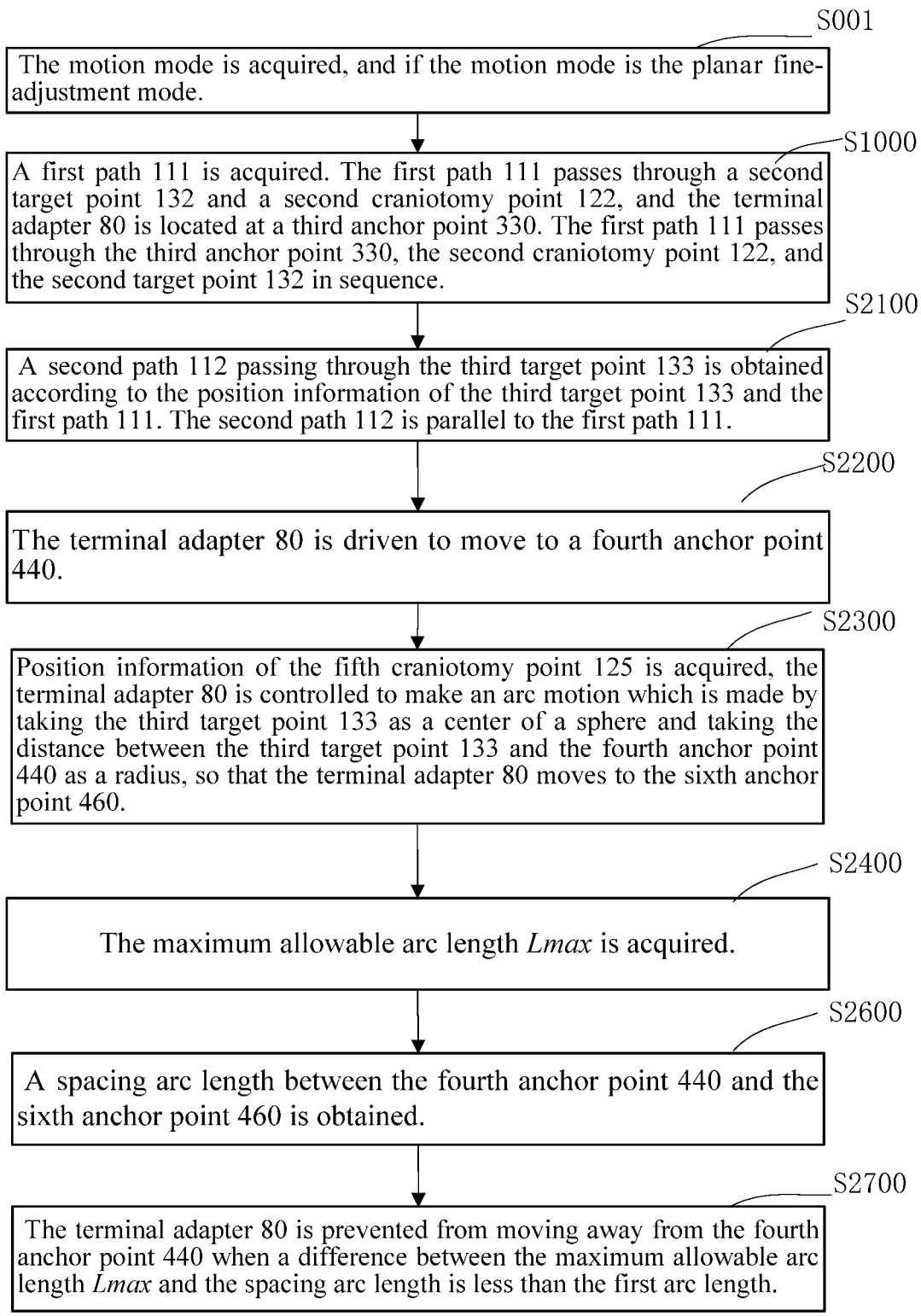
FIG. 23 is a flow chart of the control method of the terminal adapter of the mechanical arm according to yet another embodiment of this application.

Referring to FIG. 23, in an embodiment, the control method for the terminal adapter 80 of the mechanical arm 60 further includes following steps.

At step S2400, the maximum allowable arc length Lmax is acquired.

At step S2600, a spacing arc length between the fourth anchor point 440 and the sixth anchor point 460 is obtained.

At step S2700, the terminal adapter 80 is prevented from moving away from the fourth anchor point 440 when a difference between the maximum allowable arc length Lmax and the spacing arc length is less than the first arc length. That is, the terminal adapter 80 can move only towards the fourth anchor point 440 or does not move, thus preventing the terminal adapter 80 from moving beyond the maximum allowable arc length Lmax, and protecting the brain from being damaged due to the terminal adapter 80 moving beyond the safe area.

In an embodiment, when the difference between the maximum allowable arc length Lmax and the spacing arc length is less than the first arc length and greater than the second arc length, the terminal adapter 80 is controlled to move step by step with the second arc length. The second arc length is smaller than the first arc length.

The step of preventing the terminal adapter 80 from moving away from the fourth anchor point 440 is performed when the difference between the maximum allowable arc length Lmax and the spacing arc length is less than the second arc length. By adjusting and reducing the step arc length of the terminal adapter 80, the step-by-step moving range of the terminal adapter 80 may be increased to obtain a larger correction space for the craniotomy point.

In an embodiment, the control method for the terminal adapter 80 of the mechanical arm 60 further includes:

controlling the terminal adapter 80 to reset to the third anchor point 330 to avoid re-planning a path due to operational errors.

Figure 24:
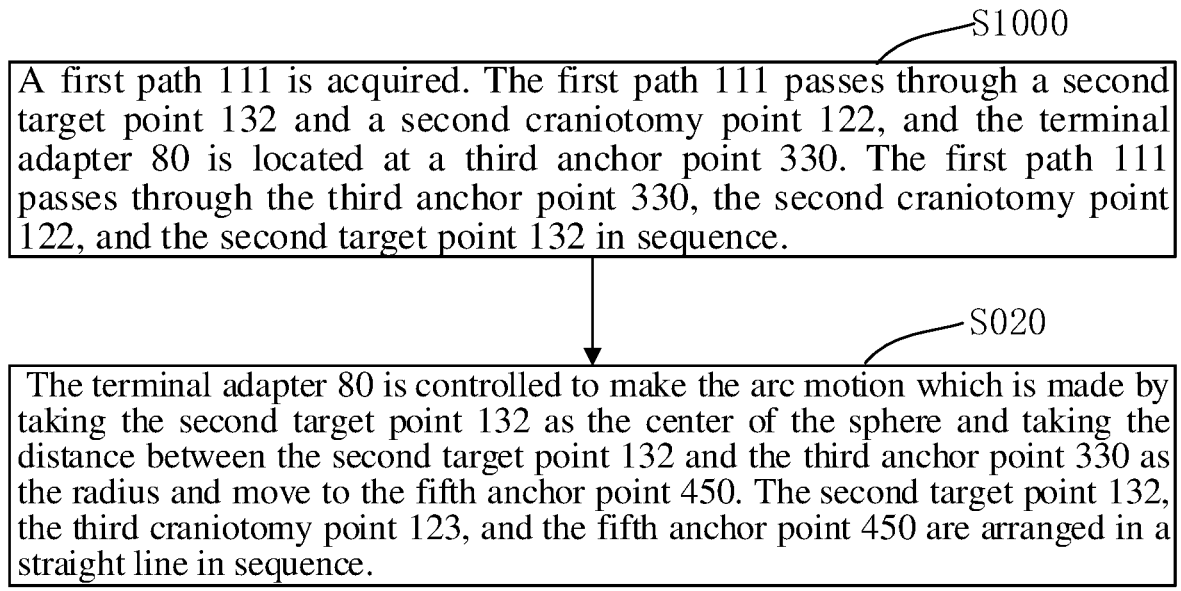
FIG. 24 is a flow chart of the control method of the terminal adapter of the mechanical arm according to yet another embodiment of this application.
Figure 25:
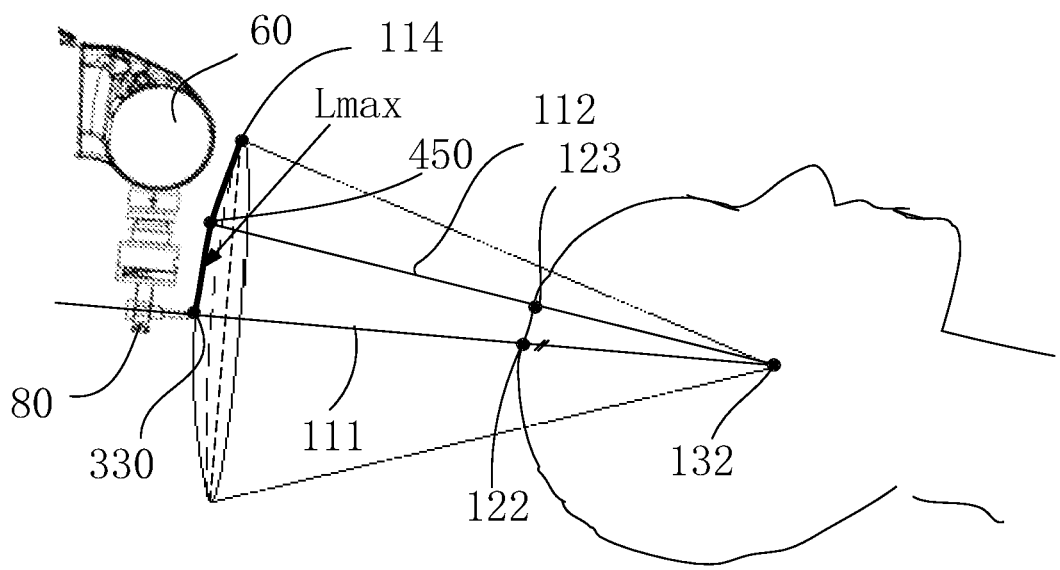
FIG. 25 is a schematic view showing a spheric mode of the terminal adapter of the mechanical arm according to an embodiment of this application.

Referring to FIG. 24 and FIG. 25, in an embodiment, if the position command is position information of the third craniotomy point 123, then the step of controlling the terminal adapter 80 to move along the first spherical surface in which the third anchor point 330 is located according to the position command includes the following step.

At step S020, the terminal adapter 80 is controlled to make the arc motion which is made by taking the second target point 132 as the center of the sphere and taking the distance between the second target point 132 and the third anchor point 330 as the radius and move to the fifth anchor point 450. The second target point 132, the third craniotomy point 123, and the fifth anchor point 450 are arranged in a straight line in sequence.

In the control method for the terminal adapter 80 of the mechanical arm 60 provided by the embodiment of this application, the positions of the third craniotomy point 123 and the second target point 132 are positioned, and a new puncture path is obtained through planning the arc motion which is made by taking the second target point 132 as the center of the sphere and by taking the distance between the second target point 132 and the fifth anchor point 450 as the radius. The control method for the terminal adapter 80 of the mechanical arm 60 avoids the remodeling, the data acquisition and the path planning, and saves time. Even if the position of the target point is changed for several times, the new puncture path may be quickly obtained, thereby improving the efficiency of the surgery.

Figure 26:
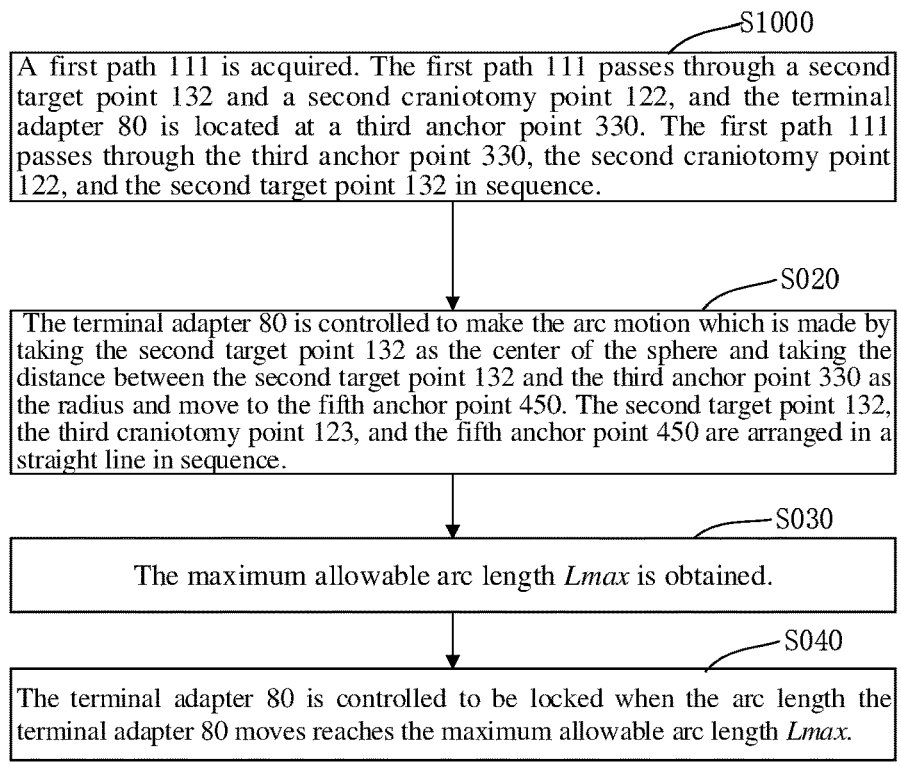
FIG. 26 is a flow chart of a control method of the terminal adapter of the mechanical arm according to another embodiment of this application.

Referring to FIG. 26, in an embodiment, after the step S020, the control method for the terminal adapter 80 of the mechanical arm 60 further includes following steps.

At step S030, the maximum allowable arc length Lmax is obtained.

At step S040, the terminal adapter 80 is controlled to be locked when the arc length the terminal adapter 80 moves reaches the maximum allowable arc length Lmax, to ensure the safety of the position of the craniotomy point of the puncture operation.

The maximum allowable arc length Lmax is a maximum displacement of the arc motion which is made by taking the second target point 132 as the center of the sphere and taking the distance between the second target point 132 and the third anchor point 330 as the radius.

In FIG. 25, the edge point of an arc away from the third anchor point 330 is a second limit point 114. Where the arc corresponds to the maximum displacement of the arc motion which is made by taking the distance between the second target point 132 and the third anchor point 330 as the radius. The arc length between the third anchor point 330 and the second limit point 114 is the maximum allowable arc length Lmax. The maximum allowable arc length Lmax is related to the location of the original target and the tissue structure of the brain.

In an embodiment, the step of controlling the terminal adapter 80 to make the arc motion which is made by taking the second target point 132 as the center of the sphere and taking the distance between the second target point 132 and the third anchor point 330 as the radius and to move to the fifth anchor point 450 includes:

controlling the terminal adapter 80 to move to the fifth anchor point 450 step by step with the first arc length.

After the terminal adapter 80 moves to the fifth anchor point 450, the control method further includes:

controlling the terminal adapter 80 to move towards the second target point 132.

The control method for the terminal adapter 80 of the mechanical arm 60 controls the terminal adapter 80 to move in the step-by-step moving manner, so that the position information of the terminal adapter 80 may be accurately obtained by recording the number of steps, thereby reducing the information delay and improving the security.

Figure 27:
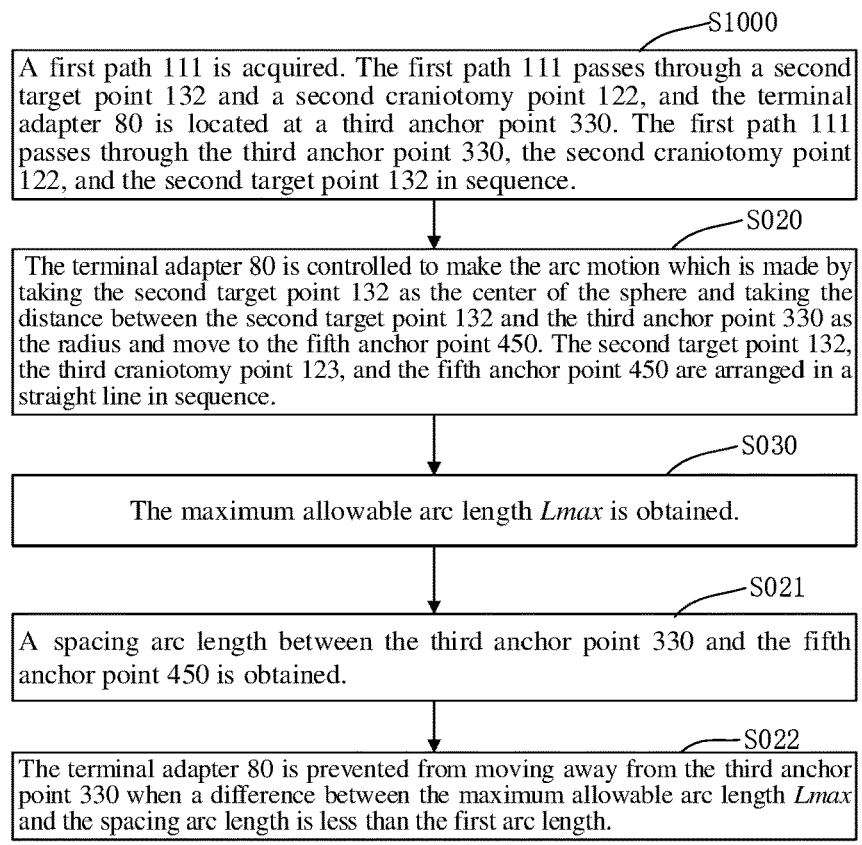
FIG. 27 is a flow chart of a control method of the terminal adapter of the mechanical arm according to yet another embodiment of this application.

Referring to FIG. 27, in an embodiment, after the step S020, the control method for the terminal adapter 80 of the mechanical arm 60 further includes following steps.

At step S030, a maximum allowable arc length Lmax is obtained.

At step S021, a spacing arc length between the third anchor point 330 and the fifth anchor point 450 is obtained.

At step S022, the terminal adapter 80 is prevented from moving away from the third anchor point 330 when a difference between the maximum allowable arc length Lmax and the spacing arc length is less than the first arc length. That is, the terminal adapter 80 can only move towards the third anchor point 330 or does not move, thus preventing the terminal adapter 80 from moving beyond the maximum allowable distance Lmax, and protecting the brain from being damaged due to the terminal adapter 80 moving beyond the safe area.

In an embodiment, the control method for the terminal adapter 80 of the mechanical arm 60 further includes following steps.

The terminal adapter 80 is controlled to move step by step with the second arc length, when the difference between the maximum allowable arc length Lmax and the spacing arc length is less than the first arc length and greater than the second arc length. The second arc length is less than the first arc length.

The step of preventing the terminal adapter 80 from moving away from the third anchor point 330 is performed when the difference between the maximum allowable arc length Lmax and the spacing arc length is less than the second arc length. By adjusting and reducing the step size of the terminal adapter 80, the step-by-step moving range of the terminal adapter 80 may be increased to obtain a larger correction space for the craniotomy point.

In an embodiment, the terminal adapter 80 is controlled to move step by step with the second arc length when the difference between the maximum allowable arc length and the spacing arc length is less than the first arc length and greater than the second arc length.

The step of preventing the terminal adapter 80 from moving away from the third anchor point 330 when the difference between the maximum allowable arc length and the spacing arc length is less than the second arc length. The second arc length is smaller than the first arc length. By adjusting and reducing the step size of the terminal adapter 80, the step-by-step moving range of the terminal adapter 80 may be increased to obtain a larger correction space for the craniotomy point.

In the spheric mode, any point may be set as a target point, and the terminal adapter 80 may be controlled to move on the spherical surface which takes the target point as a center and takes the distance between a point on the terminal adapter 80 and the target point as a radius.

The target point may be one of the craniotomy point, the target point, and any other point.

The point on the terminal adapter 80 may be defined optionally. Technical features of the embodiments described above may be combined arbitrarily. For the sake of brevity, not all possible combinations of the technical features of the embodiments above are described. However, the combinations of these technical features should be considered to be within the scope of the present description as long as these combinations do not contradict each other.

The technical features of the embodiments described above may be combined arbitrarily. For the sake of brevity, not all possible combinations of the technical features of the embodiments above are described. However, the combinations of these technical features should be considered to be within the scope of the present description as long as these combinations do not contradict each other.

The embodiments above only represent some examples of this application, and the description thereof is more specific and detailed, but is not be construed as limitation on the scope of the invention patent. It should be noted that various variations and modifications may be made by those of ordinary skill in the art without departing from the spirit and scope of this application, and these variations and modifications are all within the protection of the present application. Accordingly, the scope of protection of the present application patent should be subject to the appended claims.

The invention claimed is:

1. A surgical robot control method, comprising:
   receiving a user demand, and generating an interactive control command;
   generating a motion control command according to the interactive control command; and
   controlling a terminal of a mechanical arm to perform the motion control command, and the motion control command comprising controlling the terminal of the mechanical arm to act in accordance with a plurality of motion modes; wherein the plurality of motion modes comprises: a free motion mode, an autonomous motion mode, an axial motion mode, a fine-adjustment motion mode, and a spheric motion mode.

2. The surgical robot control method of claim 1, wherein, the motion control command comprises any one or more of following four control commands of:
   controlling each of the plurality of motion modes to be performed circularly for several times;
   controlling interactions between the autonomous motion mode and each of the free motion mode, the axial motion mode, the fine-adjustment motion mode, and the spheric motion mode to be performed;
   controlling a two-way interaction between the axial motion mode and the fine-adjustment motion mode, a two-way interaction between the axial motion mode and the spheric motion mode, and a two-way interaction between the fine-adjustment motion mode and the spheric motion mode to be performed; and
   controlling a one-way switching of each of the axial motion mode, the fine-adjustment motion mode, and the spheric motion mode to the free motion mode to be performed.

3. The surgical robot control method of claim 2, further comprising: performing an information interaction with at least one of the plurality of motion modes, and realizing a safety prevention and control for the surgical robot.

4. The surgical robot control method of claim 3, wherein a step of realizing the safety prevention and control for the surgical robot comprises realizing the safety prevention and control for the surgical robot by using any one or more of:
   executing an emergency stop control on the mechanical arm; issuing a warning of a safety risk to a user; generating an automatic evasion path for the mechanical arm; and prohibiting a motion of the mechanical arm.

5. A computer-readable storage medium, having a computer program stored thereon, wherein, the computer program, when executed by a processor, causes the processor to perform steps of the method of claim 1.

* * * * *